(12) United States Patent
Na et al.

(10) Patent No.: US 12,500,708 B2
(45) Date of Patent: Dec. 16, 2025

(54) MAXIMUM SENSITIVITY DEGRADATION

(71) Applicant: LG ELECTRONICS INC., Seoul (KR)

(72) Inventors: Yunsik Na, Seoul (KR); Yoonoh Yang, Seoul (KR); Sangwook Lee, Seoul (KR); Joongkwan Huh, Seoul (KR); Jinyup Hwang, Seoul (KR); Jinwoong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 321 days.

(21) Appl. No.: 18/229,088

(22) Filed: Aug. 1, 2023

(65) Prior Publication Data

US 2024/0048298 A1 Feb. 8, 2024

Related U.S. Application Data

(60) Provisional application No. 63/394,305, filed on Aug. 2, 2022.

(51) Int. Cl.
*H04L 5/00* (2006.01)

(52) U.S. Cl.
CPC ............. *H04L 5/001* (2013.01); *H04L 5/006* (2013.01)

(58) Field of Classification Search
CPC ............................ H04L 5/001; H04L 5/006
See application file for complete search history.

(56) References Cited

U.S. PATENT DOCUMENTS

2020/0236696 A1* 7/2020 Takahashi ........... H04W 74/004
2020/0313812 A1* 10/2020 Park ........................ H04L 5/001

* cited by examiner

*Primary Examiner* — Duc C Ho
(74) *Attorney, Agent, or Firm* — LEE, HONG, DEGERMAN, KANG & WAIMEY

(57) ABSTRACT

The present disclosure provides a UE. The UE includes at least one transceiver; at least one processor; and at least one memory that stores instructions and is operatively electrically connectable with the at least one processor. Operations performed based on the command being executed by the at least one processor may include: transmitting an uplink signal through the one or more transceivers; and receiving a downlink signal through the one or more transceivers, wherein a reference sensitivity set for the one or more transceivers for downlink reception is relaxed by the MSD.

15 Claims, 17 Drawing Sheets

MAXIMUM SENSITIVITY DEGRADATION

CROSS-REFERENCE TO RELATED APPLICATION(S)

Pursuant to 35 U.S.C. § 119(e), this application claims the benefit of U.S. Provisional Patent Application No. 63/394,305, filed on Aug. 2, 2022, the contents of which are all hereby incorporated by reference herein in their entirety.

TECHNICAL FIELD

The present specification relates to a radio communication.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 110 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

An operating band combination for Carrier Aggregation (CA) may be newly added. For a newly added band combination, a problem may occur in reception performance of User Equipment (UE) due to coexistence issues.

SUMMARY

In one aspect, a UE is provided. The UE includes at least one transceiver; at least one processor; and at least one memory that stores instructions and is operatively electrically connectable with the at least one processor. Operations performed based on the command being executed by the at least one processor may include: transmitting an uplink signal through the one or more transceivers; and receiving a downlink signal through the one or more transceivers, wherein a reference sensitivity set for the one or more transceivers for downlink reception is relaxed by the MSD.

In another aspect, a method by which the apparatus performs is provided.

DETAILED DESCRIPTION

Figure 1:
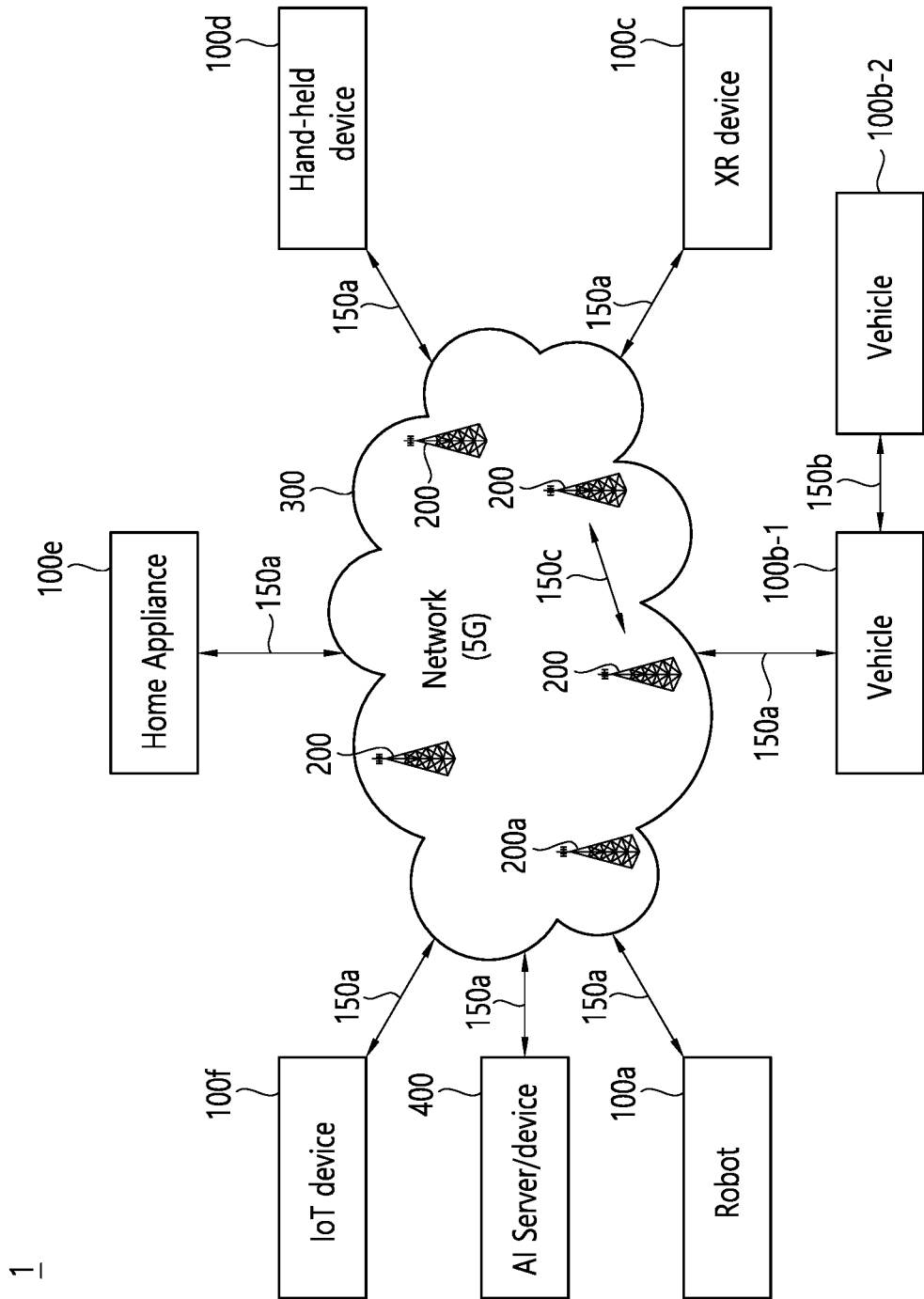
FIG. 1 shows an example of a communication system to which implementation of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFD MA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

Although a user equipment (UE) is illustrated by way of example in the accompanying drawings, the illustrated UE may be referred to as a terminal, mobile equipment (ME), and the like. In addition, the UE may be a portable device such as a notebook computer, a mobile phone, a PDA, a smartphone, and a multimedia device or may be a non-portable device such as a PC or a vehicle-mounted device.

Hereinafter, a UE is used as an example of a wireless communication device (or a wireless device or wireless equipment) capable of wireless communication. An operation performed by a UE may be performed by a wireless communication device. A wireless communication device may also be referred to as a wireless device, wireless equipment, or the like. Hereinafter, AMF may mean an AMF node, SMF may mean an SMF node, and UPF may mean a UPF node.

A base station used below generally refers to a fixed station communicating with a wireless device and may also be referred as an evolved-NodeB (eNodeB), an evolved-NodeB (eNB), a base transceiver system (BTS), an access point, and a next generation NodeB (gNB).

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100*a* to 100*f*, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100*a* to 100*f* represent devices performing communication using radio access technology (RAT) (e.g., 5G new RAT (NR)) or LTE) and may be referred to as communication/radio/5G devices. The wireless devices 100*a* to 100*f* may include, without being limited to, a robot 100*a*, vehicles 100*b*-1 and 100*b*-2, an extended reality (XR) device 100*c*, a hand-held device 100*d*, a home appliance 100*e*, an IoT device 100*f*, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless dev ices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW). FR2 may include FR2-1 and FR 2-2, as shown in the examples in Table 1 and Table 2.

TABLE 1

| Frequency Range designation | | Corresponding frequency range | Subcarrier Spacing |
|---|---|---|---|
| FR1 | | 450 MHz-6000 MHZ | 15, 30, 60 kHz |
| FR2 | FR2-1 | 24250 MHz-52600 MHZ | 60, 120, 240 kHz |
| | FR2-2 | 57000 MHz-71000 MHz | 120, 480, 960 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | | Corresponding frequency range | Subcarrier Spacing |
|---|---|---|---|
| FR1 | | 410 MHz-7125 MHZ | 15, 30, 60 kHz |
| FR2 | FR2-1 | 24250 MHz-52600 MHZ | 60, 120, 240 kHz |
| | FR2-2 | 57000 MHz-71000 MHz | 120, 480, 960 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
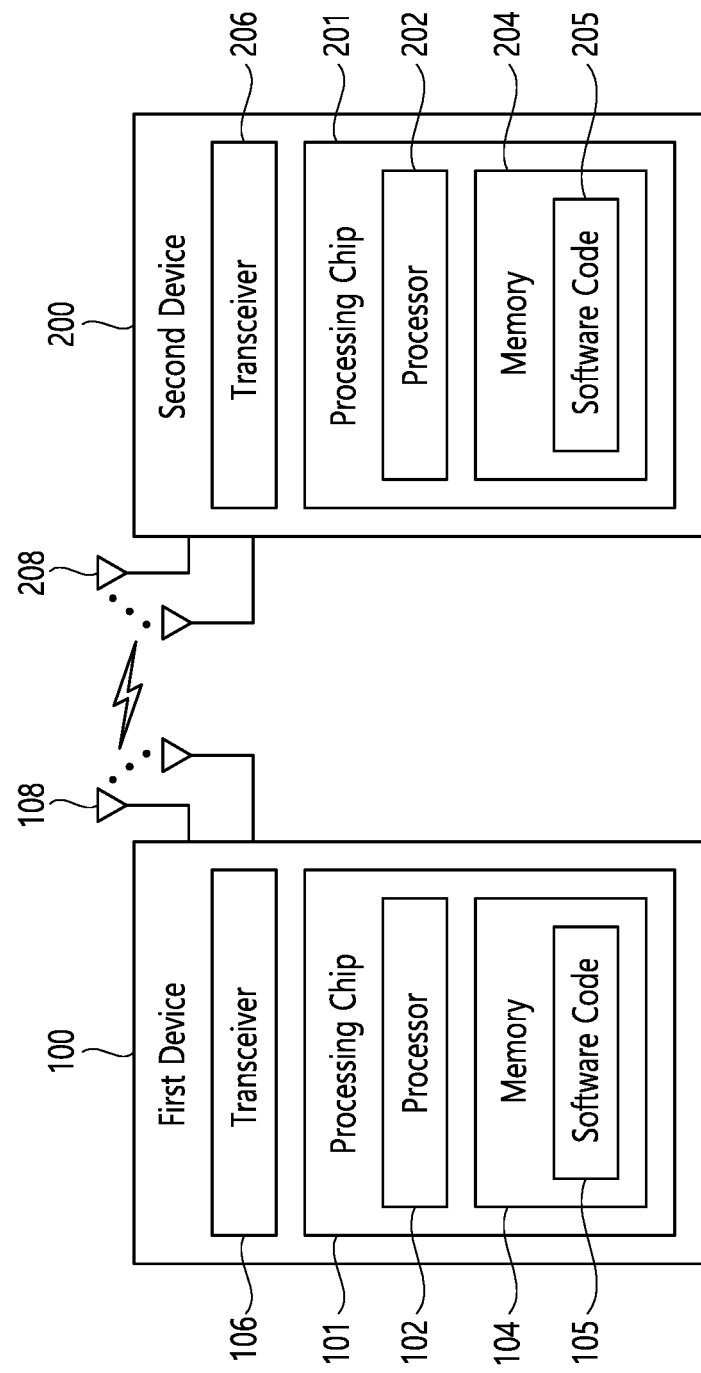
FIG. 2 shows an example of a wireless device to which implementation of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio sig nals through one or more antennas 108. Each of the transceiver 106 may include a tr ansmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/ chip.

Hereinafter, hardware elements of the wireless devices 100 and 200 will be described more specifically. One or more protocol layers may be implemented by, with out being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof.

As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control of the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
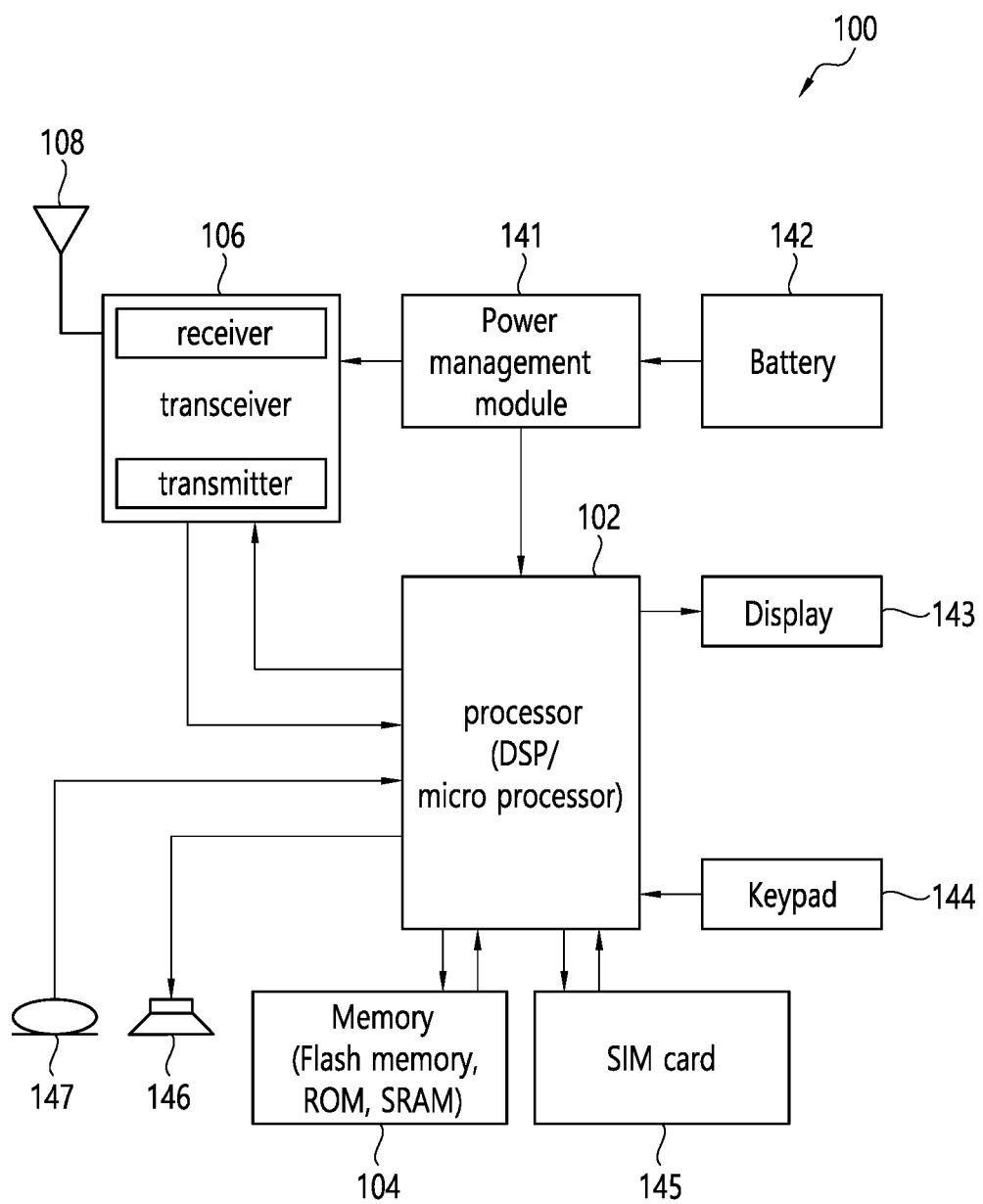
FIG. 3 shows an example of a wireless device to which implementation of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to type s of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

<Operating Bands of NR>.

The operating bands in NR are as follows

The operating bands in Table 3 below are the refarmed operating bands from the operating bands of LTE/LTE-A. This is referred to as the FR1 band.

TABLE 3

| NR operating bands | Uplink (UL) operating band $F_{UL\_low}$-$F_{UL\_high}$ | Downlink(DL) operating band $F_{DL\_low}$-$F_{DL\_high}$ | Duplex Mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n12 | 699 MHz-716 MHz | 729 MHz-746 MHz | FDD |
| n20 | 832 MHz-862 MHz | 791 MHz-821 MHz | FDD |
| n25 | 1850 MHz-1915 MHz | 1930 MHz-1995 MHz | FDD |
| n28 | 703 MHz-748 MHz | 758 MHz-803 MHz | FDD |
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n50 | 1432 MHz-1517 MHz | 1432 MHz-1517 MHz | TDD1 |
| n51 | 1427 MHz-1432 MHz | 1427 MHz-1432 MHz | TDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |
| n86 | 1710 MHz-1780 MHz | N/A | SUL |

The table below shows the NR operating band defined at high frequencies. This is called the FR2 band.

TABLE 4

| NR Operating band | Uplink (UL) operating band $F_{UL\_low}$-$F_{UL\_high}$ | Downlink(DL) operating band $F_{DL\_low}$-$F_{DL\_high}$ | Duplex Mode |
|---|---|---|---|
| n257 | 26500 MHZ-29500 MHZ | 26500 MHZ-29500 MHZ | TDD |
| n258 | 24250 MHZ-27500 MHZ | 24250 MHZ-27500 MHZ | TDD |
| n259 | 37000 MHZ-40000 MHZ | 37000 MHz-40000 MHZ | TDD |
| n260 | 37000 MHZ-40000 MHZ | 37000 MHz-40000 MHZ | FDD |
| n261 | 27500 MHZ-28350 MHZ | 27500 MHZ-28350 MHZ | FDD |

<6G System General>

A 6G (wireless communication) system has purposes such as (i) very high data rate per device, (ii) a very large number of connected devices, (iii) global connectivity, (iv) very low latency, (v) decrease in energy consumption of battery-free IoT devices, (vi) ultra-reliable connectivity, and (vii) connected intelligence with machine learning capacity. The vision of the 6G system may include four aspects such as "intelligent connectivity", "deep connectivity", "holographic connectivity" and "ubiquitous connectivity", and the 6G system may satisfy the requirements shown in Table 4 below. That is, Table 4 shows the requirements of the 6G system.

TABLE 5

| Per device peak data rate | 1 Tbps |
| E2E latency | 1 ms |
| Maximum spectral efficiency | 100 bps/Hz |
| Mobility support | Up to 1000 km/hr |
| Satellite integration | Fully |
| AI | Fully |
| Autonomous vehicle | Fully |
| XR | Fully |
| Haptic Communication | Fully |

The 6G system may have key factors such as enhanced mobile broadband (eMBB), ultra-reliable low latency communications (URLLC), massive machine type communications (mMTC), AI integrated communication, tactile Internet, high throughput, high network capacity, high energy efficiency, low backhaul and access network congestion and enhanced data security.

Figure 4:
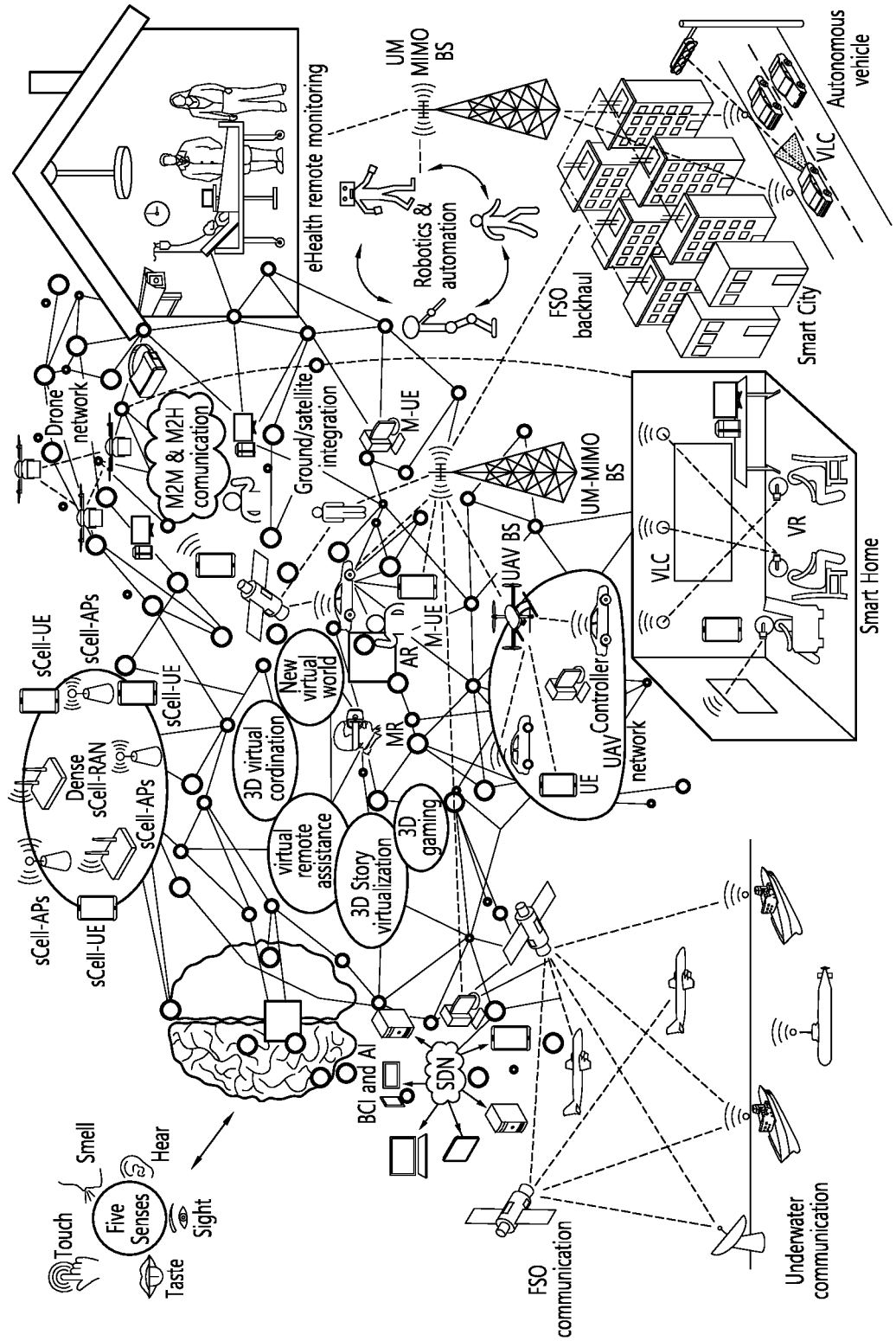
FIG. 4 shows an example of a radio frame structure of NR to which implementation of the present disclosure is applied.

FIG. 4 is a diagram showing an example of a communication structure that can be provided in a 6G system.

The 6G system will have 50 times higher simultaneous wireless communication connectivity than a 5G wireless communication system. URLLC, which is the key feature of 5G, will become more important technology by providing end-to-end latency less than 1 ms in 6G communication. At this time, the 6G system may have much better volumetric spectrum efficiency unlike frequently used domain spectrum efficiency. The 6G system may provide advanced battery technology for energy harvesting and very long battery life and thus mobile devices may not need to be separately charged in the 6G system. In addition, in 6G, new network characteristics may be as follows.

Satellites integrated network: To provide a global mobile group, 6G will be integrated with satellite. Integrating terrestrial waves, satellites and public networks as one wireless communication system may be very important for 6G.

Connected intelligence: Unlike the wireless communication systems of previous generations, 6G is innovative and wireless evolution may be updated from "connected things" to "connected intelligence". AI may be applied in each step (or each signal processing procedure which will be described below) of a communication procedure.

Seamless integration of wireless information and energy transfer: A 6G wireless network may transfer power in order to charge the batteries of devices such as smartphones and sensors. Therefore, wireless information and energy transfer (WIET) will be integrated.

Ubiquitous super 3-dimension connectivity: Access to networks and core net work functions of drones and very low earth orbit satellites will establish super 3D connection in 6G ubiquitous.

In the new network characteristics of 6G, several general requirements may be as follows.

Small cell networks: The idea of a small cell network was introduced in order to improve received signal quality as a result of throughput, energy efficiency and spectrum efficiency improvement in a cellular system. As a result, the small cell net work is an essential feature for 5G and beyond 5G (5GB) communication systems. Accordingly, the 6G communication system also employs the characteristics of the small cell network.

Ultra-dense heterogeneous network: Ultra-dense heterogeneous networks will be another important characteristic of the 6G communication system. A multi-tier net work composed of heterogeneous networks improves overall QoS and reduce costs.

High-capacity backhaul: Backhaul connection is characterized by a high-capacity backhaul network in order to support high-capacity traffic. A high-speed optical fiber and free space optical (FSO) system may be a possible solution for this problem.

Radar technology integrated with mobile technology: High-precision localization (or location-based service) through communication is one of the functions of the 6G wireless communication system. Accordingly, the radar system will be integrated with the 6G network.

Softwarization and virtualization: Softwarization and virtualization are two important functions which are the bases of a design process in a 5GB network in order to ensure flexibility, reconfigurability and programmability.

<Core Implementation Technology of 6G System>
Artificial Intelligence

Technology which is most important in the 6G system and will be newly introduced is AI. AI was not involved in the 4G system. A 5G system will support partial or very limited AI. However, the 6G system will support AI for full automation. Advance in machine learning will create a more intelligent network for real-time communication in 6G. When AI is introduced to communication, real-time data transmission may be simplified and improved. AI may determine a method of performing complicated target tasks using countless analysis. That is, AI may increase efficiency and reduce processing delay.

Time-consuming tasks such as handover, network selection or resource scheduling may be immediately performed by using AI. AI may play an important role even in M2M, machine-to-human and human-to-machine communication. In addition, AI may be rapid communication in a brain computer interface (BCI). An AI based communication system may be supported by meta materials, intelligent structures, intelligent networks, intelligent devices, intelligent recognition radios, self-maintaining wireless networks and machine learning.

Recently, attempts have been made to integrate AI with a wireless communication system in the application layer or the network layer, but deep learning have been focused on the wireless resource management and allocation field. However, such studies are gradually developed to the MAC layer and the physical layer, and, particularly, attempts to combine deep learning in the physical layer with wireless transmission are emerging. AI-based physical layer transmission means applying a signal processing and communication mechanism based on an AI driver rather than a traditional communication framework in a fundamental signal processing and communication mechanism. For example, channel coding and decoding based on deep learning, signal estimation and detection based on deep learning, multiple input multiple output (MIMO) mechanisms based on deep learning, resource scheduling and allocation based on AI, etc. may be included.

Machine learning may be used for channel estimation and channel tracking and may be used for power allocation, interference cancellation, etc. in the physical layer of DL. In addition, machine learning may be used for antenna selection, power control, symbol detection, etc. in the MIMO system.

Machine learning refers to a series of operations to train a machine in order to create a machine which can perform tasks which cannot be performed or are difficult to be performed by people. Machine learning requires data and learning models. In machine learning, data learning methods may be roughly divided into three methods, that is, supervised learning, unsupervised learning and reinforcement learning.

Neural network learning is to minimize output error. Neural network learning refers to a process of repeatedly inputting training data to a neural network, calculating the error of the output and target of the neural network for the training data, back propagating the error of the neural network from the output layer of the neural network to an input layer in order to reduce the error and updating the weight of each node of the neural network.

Supervised learning may use training data labeled with a correct answer and the unsupervised learning may use training data which is not labeled with a correct answer. That is, for example, in case of supervised learning for data classification, training data may be labeled with a category. The labeled training data may be input to the neural network, and the output (category) of the neural network may be compared with the label of the training data, thereby calculating the error. The calculated error is backpropagated from the neural network backward (that is, from the output layer to the input layer), and the connection weight of each node of each layer of the neural network may be updated according to backpropagation. Change in updated connection weight of each node may be determined according to the learning rate. Calculation of the neural network for input data and backpropagation of the error may configure a learning cycle (epoch). The learning data is differently applicable according to the number of repetitions of the learning cycle of the neural network. For example, in the early phase of learning of the neural network, a high learning rate may be used to increase efficiency such that the neural network rapidly ensures a certain level of performance and, in the late phase of learning, a low learning rate may be used to increase accuracy.

The learning method may vary according to the feature of data. For example, for the purpose of accurately predicting data transmitted from a transmitter in a receiver in a communication system, learning may be performed using supervised learning rather than unsupervised learning or reinforcement learning.

The learning model corresponds to the human brain and may be regarded as the most basic linear model. However, a paradigm of machine learning using a neural network structure having high complexity, such as artificial neural networks, as a learning model is referred to as deep learning.

Neural network cores used as a learning method may roughly include a deep neural network (DNN) method, a convolutional deep neural network (CNN) method, a recurrent Boltzmman machine (RNN) method and a spiking neural networks (SNN). Such a learning model is applicable.

THz (Terahertz) Communication

A data rate may increase by increasing bandwidth. This may be performed by using sub-TH communication with wide bandwidth and applying advanced massive MIMO technology. THz waves which are known as sub-millimeter radiation, generally indicates a frequency band between 0.1 THz and 10 THz with a corresponding wave length in a range of 0.03 mm to 3 mm. A band range of 100 GHz to 300

GHz (sub THz band) is regarded as a main part of the THz band for cellular communication. When the sub-THz band is added to the mmWave band, the 6G cellular communication capacity increases. 300 GHz to 3 THz of the defined THz band is in a far infrared (IR) frequency band. A band of 300 GHz to 3 THz is a part of an optical band but is at the border of the optical band and is just behind an RF band. Accordingly, the band of 300 GHz to 3 THz has similarity with RF.

Figure 5:
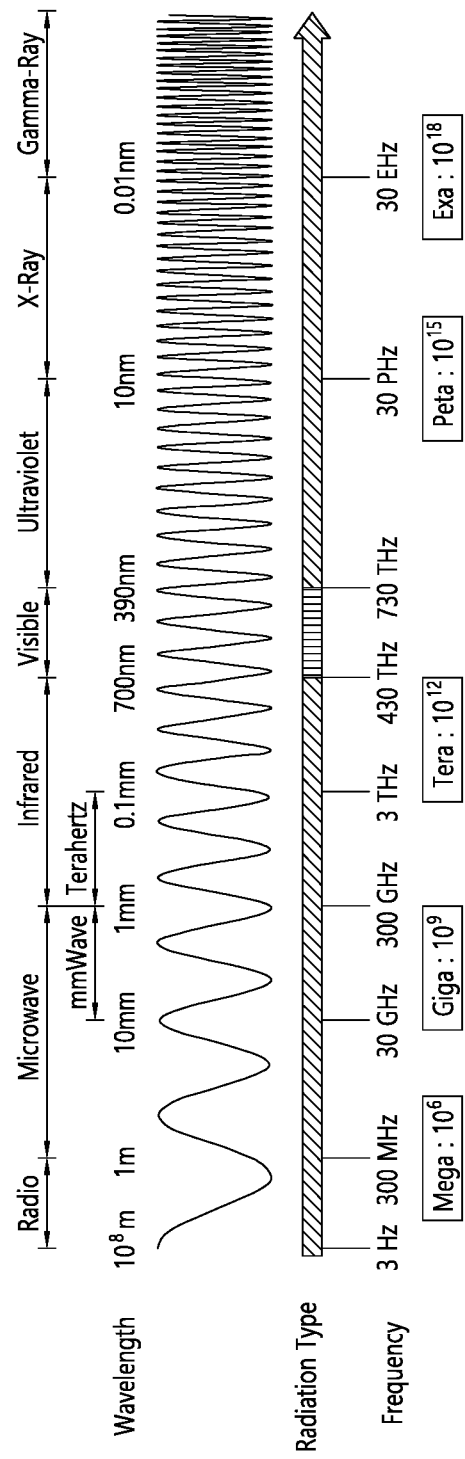
FIG. 5 shows an example of a slot structure of an NR frame to which implementation of the present disclosure is applied.

FIG. 5 shows an example of an electromagnetic spectrum.

The main characteristics of THz communication include (i) bandwidth widely available to support a very high data rate and (ii) high path loss occurring at a high frequency (a high directional antenna is indispensable). A narrow beam width generated in the high directional antenna reduces interference. The small wavelength of a THz signal allows a larger number of antenna elements to be integrated with a device and BS operating in this band. Therefore, an advanced adaptive arrangement technology capable of overcoming a range limitation may be used.

Large-Scale MIMO

One of core technologies for improving spectrum efficiency is MIMO technology. When MIMO technology is improved, spectrum efficiency is also improved. Accordingly, massive MIMO technology will be important in the 6G system. Since MIMO technology uses multiple paths, multiplexing technology and beam generation and management technology suitable for the THz band should be significantly considered such that data signals are transmitted through one or more paths.

Hologram Beamforming

Beamforming is a signal processing procedure that adjusts an antenna array to transmit radio signals in a specific direction. This is a subset of smart antennas or advanced antenna systems. Beamforming technology has several advantages, such as high signal-to-noise ratio, interference prevention and rejection, and high network efficiency. Hologram Beamforming (HBF) is a new beamforming method that differs significantly from MIMO systems because this uses a software-defined antenna. HBF will be a very effective approach for efficient and flexible transmission and reception of signals in multi-antenna communication devices in 6G.

Optical Wireless Technology

Optical wireless communication (OWC) is a form of optical communication that uses visible light, infrared light (IR), or ultraviolet light (UV) to carry signals. OWC operating in the visible light band (e.g., 390 to 750 nm) is commonly referred to as visible light communication (VLC). VLC implementations can utilize light-emitting diodes (LEDs). VLC can be used in a variety of applications, including wireless local area networks, wireless personal area networks, and vehicular networks.

VLC has several advantages over RF-based technologies. First, the spectrum occupied by VLC is free/unlicensed and can provide extensive bandwidth (THz-level bandwidth). Second, VLC rarely causes significant interference to other electromagnetic devices; therefore, VLC can be applied in sensitive electromagnetic interference applications such as aircraft and hospitals. Third, VLC has strengths in communication security and privacy. The transmission medium of VLC-based networks, namely visible light, cannot pass through walls and other opaque obstacles. Therefore, the transmission range of VLC can be limited to indoors, which can protect users' privacy and sensitive information. Fourth, VLC can use any light source as a base station, eliminating the need for expensive base stations.

Free-space optical communication (FSO) is an optical communication technology that uses light propagating in free space, such as air, outer space, and vacuum, to wirelessly transmit data for telecommunications or computer networking. FSO can be used as a point-to-point OWC system on the ground. FSO can operate in the near-infrared frequency (750-1600 nm). Laser transmitters may be used in FSO implementations, and FSO can provide high data rates (e.g., 10 Gbit/s), providing a potential solution to backhaul bottlenecks.

These OWC technologies are planned for 6G communications in addition to RF-based communications for all possible device-to-access networks. These networks will access network-to-backhaul/fronthaul network connections. OWC technology has already been in use since 4G communication systems, but will be more widely used to meet the needs of 6G communication systems. OWC technologies such as light fidelity, visible light communication, optical camera communication, and FSO communication based on optical bands are already well-known technologies. Communication based on optical wireless technology can provide extremely high data rates, low latency, and secure communication.

Light Detection And Ranging (LiDAR) is also based on the optical band and can be utilized in 6G communications for ultra-high resolution 3D mapping. LiDAR is a remote sensing method that uses near-infrared, visible, and ultraviolet light to illuminate an object, and the reflected light is detected by a light sensor to measure distance. LiDAR can be used for fully automated driving of cars.

FSO Backhaul Network

The characteristics of the transmitter and receiver of the FSO system are similar to those of an optical fiber network. Accordingly, data transmission of the FSO system similar to that of the optical fiber system. Accordingly, FSO may be a good technology for providing backhaul connection in the 6G system along with the optical fiber network. When FSO is used, very long-distance communication is possible even at a distance of 10,000 km or more. FSO supports mass backhaul connections for remote and non-remote areas such as sea, space, underwater and isolated islands. FSO also supports cellular base station connections.

Non-Terrestrial Networks (NTN)

The 6G system will integrate terrestrial and aerial networks to support vertically expanding user communications. 3D BS will be delivered via low-orbit satellites and UAVs. Adding a new dimension in terms of altitude and associated degrees of freedom makes 3D connectivity quite different from traditional 2D networks. NR considers Non-Terrestrial Networks (NTNs) as one way to accomplish this. An NTN is a network or network segment that uses RF resources aboard a satellite (or UAS platform). There are two common scenarios for NTNs that provide access to user equipment: transparent payloads and regenerative payloads. The following are the basic elements of an NTN.

One or more sat-gateways that connect the NTN to the public data network.

GEO satellites are fed by one or several satellite gateways deployed across the satellite target range (e.g., regional or continental coverage). We assume that the UEs in a cell are served by only one sat-gateway.

Non-GEO satellites that are continuously serviced by one or multiple satellite gateways at a time. The system ensures service and feeder link continuity between successively serviced satellite gateways with a time duration sufficient to allow for mobility anchoring and handover.

The feeder link or radio link between the satellite gateway and the satellite (or UAS platform).

The service link or radio link between the user equipment and the satellite (or UAS platform).

A satellite (or UAS platform) that can implement transparent or regenerative (with onboard processing) payloads. Satellite (or UAS platform) generated beams typically produce multiple beams for a given service area, depending on the field of view. The footprint of the beam is typically elliptical. The field of view of the satellite (or UAS platform) depends on the onboard antenna diagram and the minimum angle of attack.

Transparent payload: Radio frequency filtering, frequency conversion, and amplification, so the waveform signal repeated by the payload is unchanged.

Regenerative payload: radio frequency filtering, frequency conversion and amplification, demodulation/decryption, switching and/or routing, and coding/modulation. This is effectively the same as having all or part of the base station functions (e.g. gNB) on board a satellite (or UAS platform).

For satellite deployments, optionally an inter-satellite link (ISL). This requires a regenerative payload on the satellite. ISLs can operate at RF frequencies or in the optical band.

User equipment is served by satellites (or UAS platforms) within the targeted coverage area.

Typically, GEO satellites and UAS are used to provide continental, regional, or local services.

Typically, constellations in LEO and MEO are used to provide coverage in both the Northern and Southern Hemispheres. In some cases, constellations can also provide global coverage, including polar regions. The latter requires proper orbital inclination, sufficient beams generated, and links between satellites.

Quantum Communication

Quantum communication is a next-generation communication technology that can overcome the limitations of conventional communication such as security and high-speed computation by applying quantum mechanical properties to the field of information and communication. Quantum communication provides a means of generating, transmitting, processing, and storing information that cannot be expressed in the form of 0s and 1s according to the binary bit information used in existing communication technologies. In conventional communication technologies, wavelengths or amplitudes are used to transmit information between the transmitting and receiving ends, but in quantum communication, photons, the smallest unit of light, are used to transmit information between the transmitting and receiving ends. In particular, in the case of quantum communication, quantum uncertainty and quantum irreversibility can be used for the polarization or phase difference of photons (light), so quantum communication has the characteristic of being able to communicate with perfect security. In addition, quantum communication can also enable ultra-high-speed communication using quantum entanglement under certain conditions.

Cell-free Communication

Tight integration of multiple frequencies and heterogeneous communication technologies is critical in 6G systems. As a result, users can seamlessly move from one network to another without having to create any manual configurations on their devices. The best network is automatically selected from the available communication technologies. This will break the limitations of the cell concept in wireless communication. Currently, user movement from one cell to another causes too many handovers in dense networks, resulting in handover failures, handover delays, data loss, and ping-pong effects. 6G cell-free communication will overcome all this and provide better QoS.

Cell-free communication is defined as "a system in which a large number of geographically distributed antennas (APs) cooperatively serve a small number of terminals using the same time/frequency resources with the help of a fronthaul network and a CPU". A single terminal is served by a set of multiple APs, which is called an AP cluster. There are several ways to form AP clusters, among which the method of configuring AP clusters with APs that can significantly contribute to improving the reception performance of the terminal is called the terminal-centered clustering method, and when using this method, the configuration is dynamically updated as the terminal moves. By adopting this device-centric AP clustering technique, the device is always at the center of the AP cluster and is therefore free from inter-cluster interference that can occur when the device is located at the boundary of the AP cluster. This cell-free communication will be achieved through multi-connectivity and multi-tier hybrid technologies and different heterogeneous radios in the device.

Integration of Wireless Information and Energy Transfer (WIET)

WIET uses the same field and wave as a wireless communication system. In particular, a sensor and a smartphone will be charged using wireless power transfer during communication. WIET is a promising technology for extending the life of battery charging wireless systems. Therefore, devices without batteries will be supported in 6G communication.

Integration of Wireless Communication and Sensing

An autonomous wireless network is a function for continuously detecting a dynamically changing environment state and exchanging information between different nodes. In 6G, sensing will be tightly integrated with communication to support autonomous systems.

Integrated Access and Backhaul Network

In 6G, the density of access networks will be enormous. Each access network is connected by optical fiber and backhaul connection such as FSO network. To cope with a very large number of access networks, there will be a tight integration between the access and backhaul networks.

Big Data Analysis

Big data analysis is a complex process for analyzing various large data sets or big data. This process finds information such as hidden data, unknown correlations, and customer disposition to ensure complete data management. Big data is collected from various sources such as video, social networks, images and sensors. This technology is widely used for processing massive data in the 6G system.

Reconfigurable Intelligent Surface

There is a large body of research that considers the radio environment as a variable to be optimized along with the transmitter and receiver. The radio environment created by this approach is referred to as a Smart Radio Environment (SRE) or Intelligent Radio Environment (IRE) to highlight its fundamental differences from past design and optimization criteria. Various terms have been proposed for the reconfigurable intelligent antenna (or intelligent reconfigurable antenna technology) technology that enables SRE, including Reconfigurable Metasurfaces, Smart Large Intelligent Surfaces (SLIS), Large Intelligent Surfaces (LIS), Reconfigurable Intelligent Surface (RIS), and Intelligent Reflecting Surface (IRS).

In the case of THz band signals, there are many shadowed areas caused by obstacles due to the strong straightness of the signal, and RIS technology is important to expand the communication area by installing RIS near these shadowed areas, strengthening communication stability and enabling additional value-added services. RIS is an artificial surface made of electromagnetic materials that can alter the propagation of incoming and outgoing radio waves. While RIS can be seen as an extension of massive MIMO, it has a different array structure and operating mechanism than massive M IMO. RIS also has the advantage of lower power consumption because it operates as a reconfigurable reflector with passive elements, meaning it only passively reflects the signal without using an active RF chain. In addition, each of the passive reflectors in the RIS must independently adjust the phase shift of the incident signal, which can be advantageous for wireless communication channels. By properly adjusting the phase shift through the RIS controller, the reflected signal can be gathered at the target receiver to boost the received signal power.

In addition to reflecting radio signals, there are also RISs that can adjust transmission and refraction properties, and these RISs are mainly used for 021 (Outdoor to Indoor). Recently, STAR-RIS (Simultaneous Transmission and Reflection RIS), which provides transmission while reflecting, has also been actively researched.

Metaverse

Metaverse is a portmanteau of the words "meta" meaning virtual, transcendent, and "universe" meaning space. Generally speaking, the metaverse is a three-dimensional virtual space where the same social and economic activities as in the real world are commonplace.

Extended Reality (XR), a key technology enabling the Metaverse, is the fusion of the virtual and the real, which can extend the experience of reality and provide a unique sense of immersion. The high bandwidth and low latency of 6G networks will enable users to experience more immersive virtual reality (VR) and augmented reality (AR) experiences.

Autonomous Driving, Self-driving

For perfect autonomous driving, vehicles must communicate with each other to inform each other of dangerous situations, or with infrastructure such as parking lots and traffic lights to check information such as the location of parking information and signal change times. Vehicle-to-Everything (V2X), a key element in building an autonomous driving infrastructure, is a technology that enables vehicles to communicate and share information with various elements on the road, such as vehicle-to-vehicle (V2V) and vehicle-to-infrastructure (V2I), for autonomous driving.

In order to maximize the performance of autonomous driving and ensure high safety, fast transmission speeds and low latency technologies are essential. In addition, in the future, autonomous driving will go beyond delivering warnings and guidance messages to the driver to actively intervene in vehicle operation and directly control the vehicle in dangerous situations, and the amount of information that needs to be transmitted and received will be enormous, so 6G is expected to maximize autonomous driving with faster transmission speeds and lower latency than 5G.

Unmanned Aerial Vehicle (UAV)

An unmanned aerial vehicle (UAV) or drone will be an important factor in 6G wireless communication. In most cases, a high-speed data wireless connection is provided using UAV technology. A base station entity is installed in the UAV to provide cellular connectivity. UAVs have certain features, which are not found in fixed base station infrastructures, such as easy deployment, strong line-of-sight links, and mobility-controlled degrees of freedom. During emergencies such as natural disasters, the deployment of terrestrial telecommunications infrastructure is not economically feasible and sometimes services cannot be provided in volatile environments. The UAV can easily handle this situation. The UAV will be a new paradigm in the field of wireless communications. This technology facilitates the three basic requirements of wireless networks, such as eMBB, URLLC and mMTC. The UAV can also serve a number of purposes, such as network connectivity improvement, fire detection, disaster emergency services, security and surveillance, pollution monitoring, parking monitoring, and accident monitoring. Therefore, UAV technology is recognized as one of the most important technologies for 6G communication.

Block-chain

A blockchain will be important technology for managing large amounts of data in future communication systems. The blockchain is a form of distributed ledger technology, and distributed ledger is a database distributed across numerous nodes or computing devices. Each node duplicates and stores the same copy of the ledger. The b lockchain is managed through a peer-to-peer (P2P) network. This may exist without being managed by a centralized institution or server. Blockchain data is collected together and organized into blocks. The blocks are connected to each other and protected using encryption. The blockchain completely complements large-scale IoT through improved interoperability, security, privacy, stability and scalability. Accordingly, the blockchain technology provides several functions such as interoperability between devices, high-capacity data traceability, autonomous interaction of different IoT systems, and large-scale connection stability of 6G communication systems.

<Carrier Aggregation>

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provided an additional radio resource.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the specific component carrier.

Carrier aggregation may be classified into a continuous carrier aggregation in which aggregated carriers are continuous and a non-contiguous carrier aggregation in which aggregated carriers are separated from each other. In the following, carrier aggregation simply should be understood to include both the case where the component carrier (CC) is continuous and the case where it is discontinuous. The number of CCs aggregated between the downlink and the uplink may be set differently. A case in which the number of downlink CCs and the number of uplink CCs are the same may be referred to as symmetric aggregation, and a case in which the number of downlink CCs are different may be referred to as asymmetric aggregation.

On the other hand, carrier aggregation can also be classified into inter-band CA and intra-band CA. The inter-band CA is a method of aggregating and using each CC existing in different operating bands, and the intra-band CA is a method of aggregating and using each CC in the same operating band. In addition, the CA technology is more specifically, intra-band contiguous CA, intra-band non-contiguous CA and inter-band discontinuity. Non-Contiguous) CA.

Figure 6A:
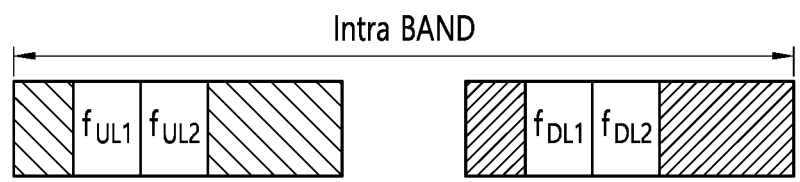
FIG. 6a illustrates a concept view of an example of intra-band contiguous CA.
Figure 6B:
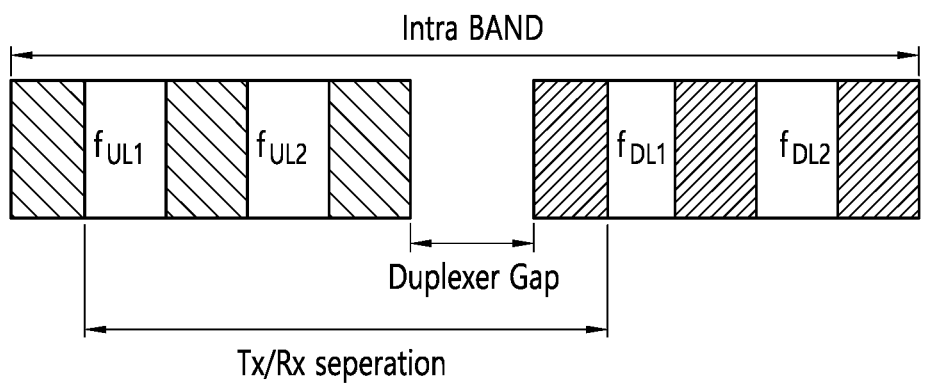
FIG. 6b illustrates a concept view of an example of intra-band non-contiguous CA.

FIG. 6a illustrates a concept view of an example of intra-band contiguous CA. FIG. 6b illustrates a concept view of an example of intra-band non-contiguous CA.

LTE-advanced adds various schemes including uplink MIMO and carrier aggregation in order to realize high-speed wireless transmission. The CA may be split into the intra-band contiguous CA shown in FIG. 6a and the intra-band non-contiguous CA shown in FIG. 6b.

Figure 7A:
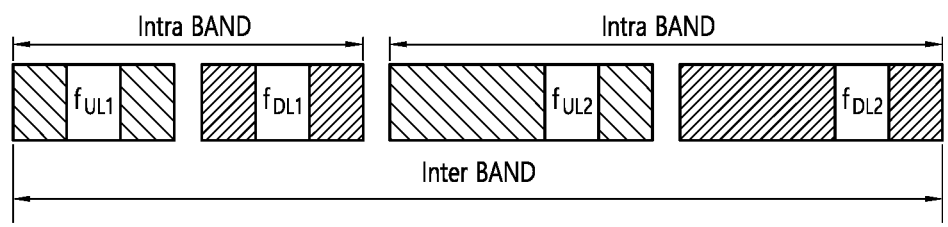
FIG. 7a illustrates a concept view of an example of a combination of a lower frequency band and a higher frequency band for inter-band CA.
Figure 7B:
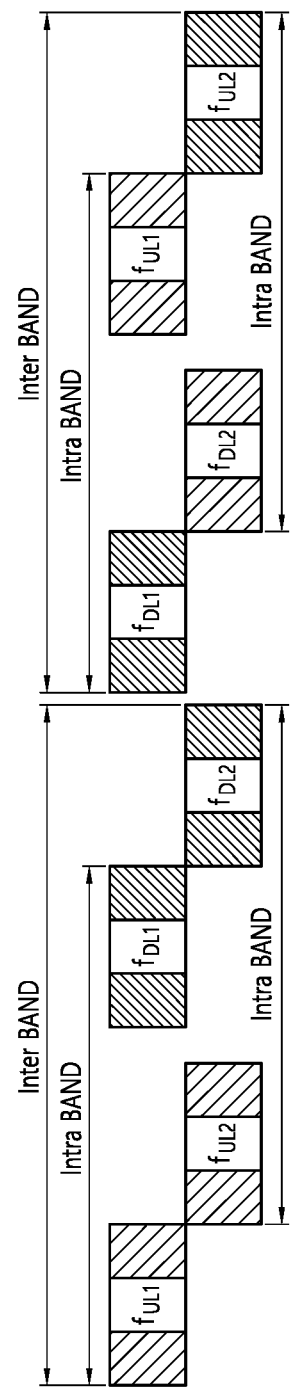
FIG. 7b illustrates a concept view of an example of a combination of similar frequency bands for inter-band CA.

FIG. 7a illustrates a concept view of an example of a combination of a lower frequency band and a higher frequency band for inter-band CA. FIG. 7b illustrates a concept view of an example of a combination of similar frequency bands for inter-band CA.

The inter-band carrier aggregation may be separated into inter-band CA between carriers of a low band and a high band having different RF characteristics of inter-band CA as shown in FIG. 7a and inter-band CA of similar frequencies that may use a common RF terminal per component carrier due to similar RF (radio frequency) characteristics as shown in FIG. 7b.

The carrier aggregation configuration is a combination of operating bands, each supporting a carrier aggregation bandwidth class. The following table is an example of CA bandwidth classes in NR.

a UE to be able to fallback to lower order NR CA bandwidth class configuration that belong to a different fallback group.
<The Present Disclosure of the Present Specification>

In 5G NR, Dual Connectivity (DC) combinations in which various E-UTRA bands and various NR bands operate simultaneously can be supported. In 5G NR, similar to LTE/LTE-A CA, maximum sensitivity degradation (MSD) due to self-interference at the terminal receiving end for dual uplink based on each DC band combination of operators needs to be defined. By defining such an MSD, it is possible to allow relaxation of reception sensitivity of the terminal. Alternatively, by defining such an M SD, an element that alleviates distortion caused by inter modulation distortion (IMD) and/or harmonic components can be additionally used (e.g., using a harmonic trap Tilter, defining measurement method in a region where there is no desense by IMD). In this way, a solution to the issue related to self-interference is needed. Additional DC combinations are being introduced to support DC LTE x band downlink/1 band uplink (x=1,2, 3,4) and NR 2 band downlink/1 band uplink. Therefore, in the present specification, among various DC/CA combinations, a band combination in which reception sensitivity degradation occurs in the reception band of the terminal itself is searched. Herein, the reception sensitivity deterioration occurs due to harmonic component and IMD effect due to dual uplink transmission and cross band isolations that can cause mutual interference due to narrow frequency interval between Tx/Rx. For example, in the present disclosure of the present specification, harmonic components and IMD effects due to dual uplink transmission among various DC/CA band combinations are analyzed. In the present disclosure of the present specification, a band combination in which reception sensitivity degradation occurs in a reception band of a terminal itself is analyzed based on a harmonic component and an IMD effect. In addition, in the present disclosure of the present specification, based on cross band isolations that can cause mutual interference due to a narrow frequency interval between Tx/Rx among various DC/CA band combinations, a band combination in which reception sensitivity deterioration occurs in the reception band of the terminal itself is analyzed. And, in the

TABLE 6

| NR CA bandwidth class | Aggregated channel bandwidth | Number of contiguous CC | Fallback group |
|---|---|---|---|
| A | $BW_{Channel} \leq BW_{Channel,\ max}$ | 1 | 1, 2, 3 |
| B | $20\ MHz \leq BW_{Channel\_CA} \leq 100\ MHz$ | 2 | 2, 3 |
| C | $100\ MHz < BW_{Channel\_CA} \leq 2 \times BW_{Channel,\ max}$ | 2 | 1, 3 |
| D | $200\ MHz < BW_{Channel\_CA} \leq 3 \times BW_{Channel,\ max}$ | 3 | |
| E | $300\ MHz < BW_{Channel\_CA} \leq 4 \times BW_{Channel,\ max}$ | 4 | |
| G | $100\ MHz < BW_{Channel\_CA} \leq 150\ MHz$ | 3 | 2 |
| H | $150\ MHz < BW_{Channel\_CA} \leq 200\ MHz$ | 4 | |
| I | $200\ MHz < BW_{Channel\_CA} \leq 250\ MHz$ | 5 | |
| J | $250\ MHz < BW_{Channel\_CA} \leq 300\ MHz$ | 6 | |
| K | $300\ MHz < BW_{Channel\_CA} \leq 350\ MHz$ | 7 | |
| L | $350\ MHz < BW_{Channel\_CA} \leq 400\ MHz$ | 8 | |
| M | $50\ MHZ < BW_{Channel\_CA} \leq [180]\ MHz$ | 3 | 3 |
| N | $80\ MHZ < BW_{Channel\_CA} \leq [240]\ MHz$ | 4 | |
| O | $100\ MHZ \leq BW_{Channel\_CA} \leq [300]\ MHz$ | 5 | |

In Table 6, $BW_{Channel\_CA}$ is maximum channel bandwidth supported among all bands. It is mandatory for a UE to be able to fallback to lower order NR CA bandwidth class configuration within a fallback group. It is not mandatory for present disclosure of the present specification, the MSD may be analyzed in consideration of the RF structure implemented in the terminal in the corresponding band combination. Based on the MSD analysis, exceptions to the reception sensitivity requirements of the corresponding band combination can be specified in the standard. Accordingly, an exception to the reception sensitivity test of the terminal may be applied. For reference, the present disclosure of this specification describes the MSD based on CA, but this is only an example, and the MSD described in the present disclosure of this specification can also be applied to DC based on the same band combination.

According to the disclosed examples of the present specification, the UE and/or the network (e.g., base station) may perform NR CA operation or EN-DC operation. In this case, the introductory examples of this specification analyze self-interference from the terminal and propose relaxed requirements for sensitivity related to the self-interference.

Figure 8:
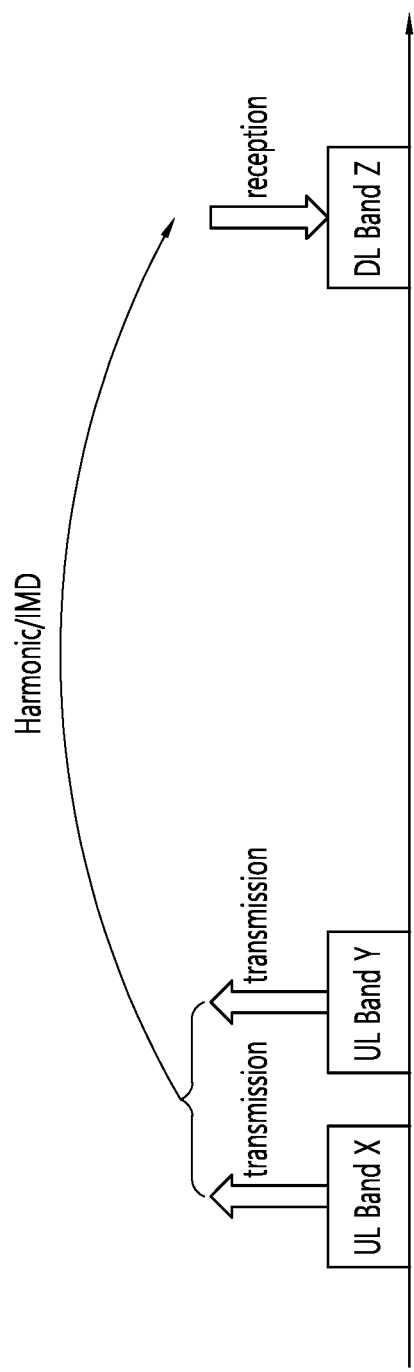
FIG. 8 illustrates a first example of situation in which an uplink signal transmitted via an uplink operating band affects reception of a downlink signal on via downlink operating band.

First, we describe an example of self-interference, referring to the example in FIG. 8.

The following drawings are intended to illustrate specific embodiments of the present disclosure. The designations of specific devices or the designations of specific signals/messages/fields shown in the drawings are for illustrative purposes only, and the technical features of this specification are not limited to the specific designations used in the drawings below.

FIG. 8 illustrates a first example of situation in which an uplink signal transmitted via an uplink operating band affects reception of a downlink signal on via downlink operating band.

In FIG. 8, intermodulation distortion (IMD) may refer to amplitude modulation of a signal comprising two or more different frequencies due to nonlinearities or time variations in the system. Intermodulation between frequency components can form additional components not only at frequencies that are not at either harmonic frequency (integer multiple), such as harmonic distortion, but also at frequencies at the sum and difference of the original frequencies, and at frequencies at the sum and difference of multiples of these frequencies.

Referring to FIG. 8, an example in which CA is configured for a UE is shown. For example, the UE may perform communication based on CA based on one downlink operating band (DL Band Z) and one uplink operating band (UL Band Y). In the example of FIG. 8, only an example in which two uplink operating bands are used and one downlink operating band is used to analyze the influence of IMD is shown, but this is only an example. The scope of the present disclosure of this specification may also include a case in which one or more downlink operating bands and two or more uplink operating bands are used.

As shown in FIG. 8, in a situation where one downlink operating band and two uplink operating bands are configured for CA, the UE can transmit an uplink signal through the two uplink operating bands. In this case, harmonic components and intermodulation distortion (IMD) components generated based on the frequency band of the uplink signal may correspond to their own downlink band. That is, in the example of FIG. 8, when the terminal transmits an uplink signal, a harmonic component and an intermodulation distortion (IMD) component may be generated, which may affect the downlink band of the terminal itself When receiving a downlink signal, the UE shall be set to satisfy the reference sensitivity power level (REFSENS), which is the minimum average power for each antenna port of the UE.

If harmonic and/or IMD components occur, as in the example of FIG. 8, it is possible that the REFSENS for the downlink signal is not satisfied due to the uplink signal transmitted by the UE itself. The reference sensitivity power level REFSENS may be the minimum average power applied to each UE antenna port for all UE categories. Based on the REFSENS, the throughput shall meet or exceed the requirements of the specified reference measurement channel.

For example, REFSENS can be set so that the downlink signal throughput of the UE is more than 95% of the maximum throughput of the reference measurement channel. When a harmonic component and/or an IMD component occurs, there is a possibility that the downlink signal throughput may be reduced to 95% or less of the maximum throughput.

Therefore, if a harmonic component and/or IMD component occurs, it can be determined whether the harmonic component and IMD component of the UE occur, and since the MSD (Maximum Sensitivity Degradation) value is defined for the frequency band, relaxation of the REFSENS may be allowed in the receiving band related to its transmission signal. Here, the MSD may mean a maximum allowable reduction of the REFSENS. If MSD is defined for a specific operating band of the UE configured with EN-DC, the REFSENS of the operating band can be relaxed by the amount of MSD defined.

The IMD component affecting the Victim band is calculated, and the MSD value may be analyzed in consideration of the IMD component. Intermodulation may refer to a distortion signal generated when two UL signals pass through a non-linear element. When analyzing IMD components, it is possible to analyze IMD components by assuming two UL bands as UL aggressors. Among DL bands, a band influenced by IMD components can be selected as DL vitim, and IMD components can be analyzed and MSD values can be determined respectively. For example, if UL band X and UL band Y affect DL band Z as well as DL band B, MSD for DL band B can also be calculated.

The NR band combination for CA described in an example of the present disclosure may include the following two combinations. NR operation bands n1, n41, and n49 combinations (e.g., CA_n1-n41-n79) and NR operation bands n41, n77, and n79 combinations (e.g., CA_n41-n77-n79) may be included.

Coexistence issues can occur when operating at 2UL/3DL, 2UL/1DL, and 2UL/2DL in CA_n1-n41-n79 frequency band combination and CA_n41-n77-n79 frequency band combination. For example, a CA can be configured for the UE based on a combination of three operating bands (e.g., a combination based on n1, n41, n79 or a combination based on n41, n77 and n79). As described in the following example, when the Victim DL band to which the coexistence issue is applied is included in the combination of the operation bands, the MSD value described below may be applied. Among these coexistence issues, examples of coexistence issues to be described in this specification are as follows:

i) CA_n1-n41-n79 Coexistence Issue:
IMD2 generated from UL n1-n41 can affect DL n79; and/or
IMD2 generated from UL n41-n79 may affect DL n1.
ii) CA_n41-n77-n79 Coexistence Issues:
IMD3 generated from UL n77-n79 may affect DL n41.

In order to calculate the effect of interference according to the above example, an RF structure in which an antenna is independent for each band is assumed. MSD was analyzed using UE Radio Frequency (RF) Front-end component parameters based on the examples in Table 7 below and UE RF Front-end component isolation parameters based on the examples in Table 8.

Table 7 shows an example of the RF Front-end component parameter of the UE for analyzing IMD and deriving MSD levels.

TABLE 7

| UE ref. architecture | Independent ant architecture with Rx diversity CA_n1-n41-n79, CA_n41-n77-n79 | | | |
|---|---|---|---|---|
| Component | IP2 (dBm) | IP3 (dBm) | IP4 (dBm) | IP5 (dBm) |
| Ant. Switch | 112 | 68 | 55 | 55 |
| Duplexer | 100 | 75 | 55 | 53 |
| PA Forward | 28.5 | 30 | 30 | 28 |
| LNA | 10 | 0 | 0 | −10 |

Table 7 shows an example of the UE RF front-end component parameter. Here, IPn may mean an n-th intercept point. For example, IP4 is a fourth intercept point. The LNA may refer to a low noise amplifier. PA may mean a power amplifier.

Using simulations based on the UE RF component parameters in Table 7, IMD problems and MSDs for various CA band combinations can be analyzed.

Table 8 shows an example of isolation levels according to the RF component of the UE to analyze IMD and derive MSD levels.

TABLE 8

| Isolation Parameter | Value (dB) | Comment |
|---|---|---|
| Antenna to Antenna | 10 | Main antenna to diversity antenna |
| PA (out) to PA (in) | 60 | PCB isolation (PA forward mixing) |
| PA (out) to PA (out) | 60 | L-H/H-L cross-band |
| PA (out) to PA (out) | 60 | H-H cross-band |
| LNA (in) to PA (out) | 60 | L-H/H-L cross-band |
| LNA (in) to PA (out) | 60 | H-H cross-band |
| Duplexer | 60 | Tx band rejection at Rx band |

According to the example in Table 8, isolation values between each component are defined. For example, the isolation between the main antenna and the diversity antenna may be 10 dB. For example, the isolation of the H(High)-H cross-band between the LNA of the part where the signal is received and the PA of the part where the signal is transmitted may be 60 dB.

Table 8 illustrates an example of a UE RF front-end component isolation parameter. The IMD problem and MSD for various CA band combinations can be analyzed using simulations based on the isolation parameters in Table 8.

As described above, based on simulations based on the examples in Tables 7 and 8, IMD problems and MSDs for various CA band combinations may be analyzed.

Hereinafter, with reference to FIGS. 9 to 12, coexistence issues for n1, n41, and n79 band combinations (e.g., CA_n1-n41-n79) are analyzed.

First, an example in which UL band n1 and n41 are aggregators that generate IMD2 and DL band n79 are victims will be described with reference to FIGS. 9 and 10.

The following drawings are intended to illustrate specific embodiments of the present disclosure. The designations of specific devices or the designations of specific signals/messages/fields shown in the drawings are for illustrative purposes only, and the technical features of this specification are not limited to the specific designations used in the drawings below.

Figure 9:
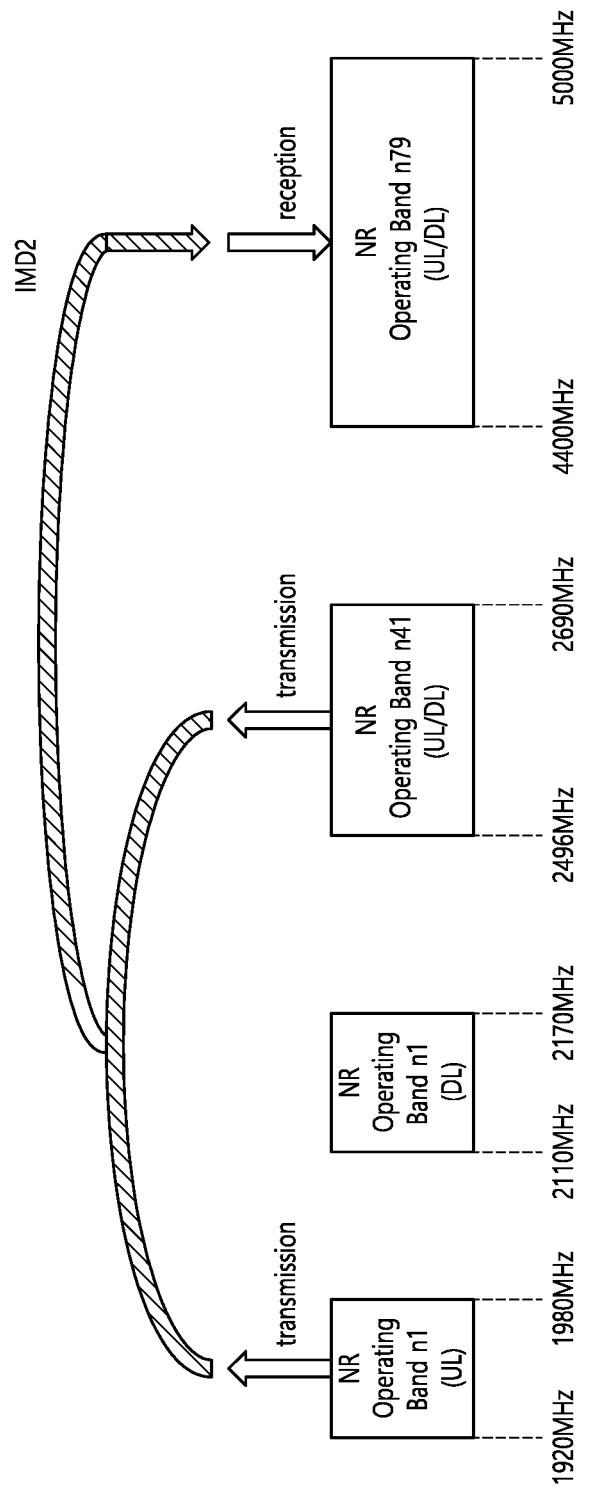
FIG. 9 illustrates a first example of a coexistence issue of CAs based on bands n1, n41, and n79 according to one disclosed embodiment of the present disclosure.

FIG. 9 illustrates a first example of a coexistence issue of CAs based on bands n1, n41, and n79 according to one disclosed embodiment of the present disclosure.

FIG. 9 describes a coexistence issue due to magnetic interference (e.g., IMD2) that occurs for the downlink band n79 when a CA based on the band combination n1, n41, and n79 is set for the UE.

For example, if an uplink signal is transmitted based on band n1 and band n41 and a downlink signal is received based on band n79, IMD 2 may be an IMD that affects band n79.

Referring to FIG. 9, the secondary IMD (IMD2) component of the uplink signal transmitted in the uplink band n1 and the uplink signal transmitted in the uplink band n41 may enter the frequency range of the downlink band n79.

The worst case in which the influence of IMD 2 is greatest within the frequency range of the downlink band n79 may be as follows. This is when the center frequency of the uplink band n1 is 1970 MHz, the center frequency of the uplink band n41 is 2530 MHz, and the center frequency of the downlink operation band n79 is 4500 MHz. In this case, since 1970+2530=4500, the frequency of the IMD2 component based on the uplink band n1 and the band n41 coincides with the center frequency of the downlink band n79.

The following drawings are intended to illustrate specific embodiments of the present disclosure. The designations of specific devices or the designations of specific signals/messages/fields shown in the drawings are for illustrative purposes only, and the technical features of this specification are not limited to the specific designations used in the drawings below.

Figure 10:
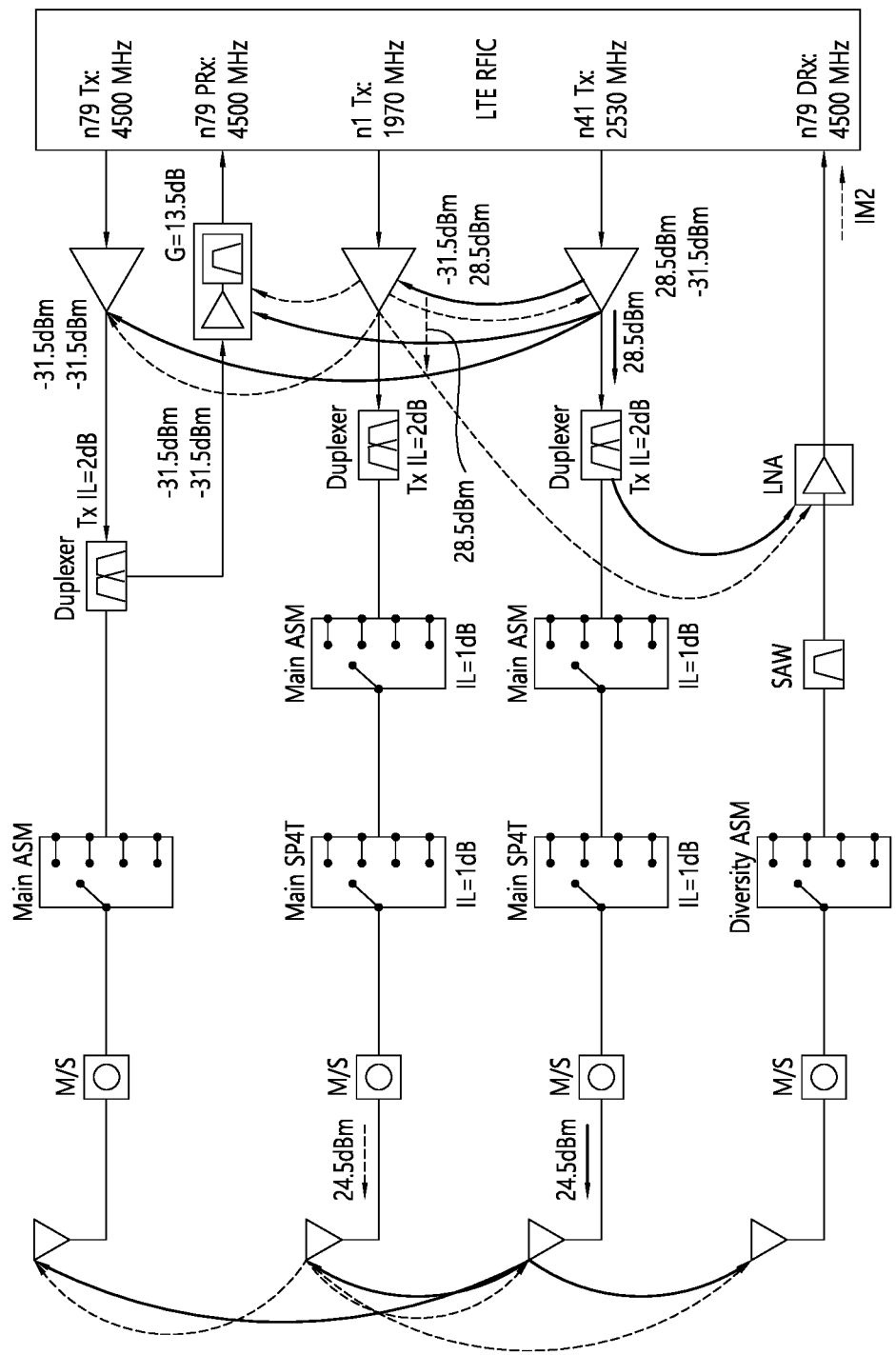
FIG. 10 illustrates a first example of an interference path according to a coexistence issue of CAs based on bands n1, n41, and n79 according to one disclosed embodiment of the present disclosure.

FIG. 10 illustrates a first example of an interference path according to a coexistence issue of CAs based on bands n1, n41, and n79 according to one disclosed embodiment of the present disclosure.

In the example of FIG. 10, M/S means a mobile switch. ASM means an antenna switch module. LNA refers to a low noise amplifier. Main SP4T stands for single pole 4 throw. RFIC refers to a radio frequency integrated circuit for RF communication. Although the LTE RFIC is illustrated in the example of FIG. 10, this is only an example, and the LTE RFIC may be replaced with the NR RFIC. Tx stands for transmission. PRx means primary Rx. DRx stands for Diversity Rx (Reception).

In the example of FIG. 10, a signal may be transmitted at a strength of 28.5 dBm at n1 Tx. In the transmission antenna of n1 Tx, a signal may be finally transmitted at a strength of 24.5 dBm. A signal may be transmitted at a strength of 28.5 dBm at n41 Tx. In the transmission antenna of n41 Tx, a signal may be finally transmitted at a strength of 24.5 dBm.

An example of FIG. 10 shows a path through which the IMD2 aggregator of Uplink n1-n41 affects downlink n79. For example, FIG. 10 shows interference paths in a situation where Uplink n1-n41 is an IMD2 aggressor and Downlink n79 is victim.

In the example of FIG. 10, two Rxs containing diversity Rx were assumed to be included in n79 Rx, and interference was analyzed as assumed. It is assumed that the duplexer insertion loss (e.g., Tx IL in FIG. 10) is 2 dB, and the insertion loss of other switches, connectors, and filters is 1 dB. The out-band IL is assumed to be 40 dB. When the signal passes through Duplex, the insertion loss of the signal passing through the inband of the duplex is expressed as IL according to the signal frequency. The insertion loss when the signal passes through the Duplex as an out-band is expressed as an out-band IL. The correction factor CF in each Rx path was set to 4 dB. Since the MSD value is analyzed for the minimum requirement, a tolerance value may be assumed, and CF may mean a tolerance value.

A signal transmitted from n1 Tx and a signal transmitted from n41 Tx may affect a receiving end of n79 based on various paths. For example, as shown on the left side of FIG. 10, signals transmitted from n1 Tx and signals transmitted from n41 Tx may flow into antennas related to n79 (e.g., antennas located at the top and bottom of FIG. 10). Various examples of paths in which the signal transmitted from n1 Tx and the signal transmitted from n41 Tx affect will be referred to the following Tables 9 and 10.

Table 9 and Table 10 show aggregator power according to paths affecting n79 Rx1 (e.g., n79 PRx in FIG. 10) and n79 Rx2 (e.g., n79 DRx in FIG. 10), respectively.

An example of an intermodulation main case of n79 Rx1 will be described with reference to Table 9.

For reference, in the examples of FIGS. 10, Table 9, and Table 10, if the signal output from PA41 affects PA1, a signal of −31.5 dBm with PCB isolation applied to 28.5 dMB may affect PA41. −31.5 dBm is also applied when the signal output from PA41 affects PA of n79 Tx. −31.5 dBm is also applied when the signal output from PA41 affects the LNA of n79 PRx (e.g., the component closest to the n79PRx of the RFIC in the example of FIG. 10). −31.5 dBm is also applied when the signal output from PA1 affects the LNA of n79 DRx.

Path 1 in Table 9 is an example of a case where both the signal of PA1 and the signal of PA41 are introduced into PA79. When the signal of PA1 and the signal of PA41 flow into PA79, PCB isolation is applied, so −31.5 dBm and −31.5 dBm flow into PA79. The signal introduced into the PA79 flows into the LNA 79 through the duplexer and then

TABLE 9

| path | n1(dBm)_L n1 | n41(dBm)_H n41 | IMD2 |
|---|---|---|---|
| <path 1><br>PA1(PCB isol) + PA41(PCBisol) -> PA79 -><br>Dup -> LNA79 = −31.5(PA1) −<br>31.5(PA41) − 28.5(PA79_IP2) − 2(Dup_IL) | −31.5 | −31.5 | −93.5 |
| <path 2><br>PA1(PCB isol) + PA41(PCB isol) -><br>LNA79 = −31.5(PA1) −<br>31.5(PA41) −10(LNA79_IP2) | −31.5 | −31.5 | −73 |
| <path 3><br>PA1 + PA41(PCB isol) -><br>Dup -> ASM -> SW -> AN<br>to AN -> SW -> Dup -> LNA79 =<br>28.5(PA1) − 31.5(PA41) − 28.5(PA1_IP2) −<br>40(out-band IL) − 1(ASM) − 1(SW) −<br>10(Ant_isol) − 1(SW) − 2(Dup) | 28.5 | −31.5 | −86.5 |
| <path 4><br>PA1(PCB isol ) +<br>PA41 -> Dup -> ASM -> SW -> AN<br>to AN -> SW -> Dup -> LNA79 = −31.5(PA1) +<br>28.5(PA41) − 28.5(PA41_IP2) −<br>40(out-band IL) − 1(ASM) − 1(SW) −<br>10(Ant_isol) − 1(SW) − 2(Dup) | −31.5 | 28.5 | −86.5 |
| total IMD2 | | | −72.593 |
| total IMD after CF(4 dB) | | | −68.593 |

Dup means Duplexer. SW stands for switch. PA1 refers to a signal output from the PA of n1 Tx. PA1 (PCB isol) refers to a value in which PCB isolation is applied to a signal output from a PA of n1 Tx. PA41 means a signal output from PA of n41 Tx. PA41 (PCB isol) refers to a value in which PCB isolation is applied to a signal output from PA of n41 Tx.

For reference, n1(dBm)_L and n41(dBm)_H may mean that n1 is the lower b and n41 is the higher band based on the frequency domain.

Referring to FIG. 10, Table 9, and Table 10, the strength of the signal output from PA1 is 28.5 dBm. The strength of the signal outputted from the PA41 is 28.5 dBm.

For reference, in the examples of FIG. 10, Table 9, and Table 10, if the signal output from PA1 affects PA41, a signal of −31.5 dBm with PCB isolation applied to 28.5 dMB may affect PA41. −31.5 dBm is also applied when the signal output from PA1 affects PA of n79 Tx. −31.5 dBm is also applied when the signal output from PA1 affects the LNA of n79 PRx (e.g., the component closest to the n79 PRx of the RFIC in the example of FIG. 10). −31.5 dBm is also applied when the signal output from PA1 affects the LNA of n79 DRx.

into the RFIC. Therefore, IMD2 according to path 1 is −31.5 dBm (PA1)−31.5 dBm (PA41)−28.5 dBm (PA79_IP2)−2 dB(Dup_IL)=−93.5 dBm.

For reference, LNA79 in FIG. 10 and Table 9 means a component closest to n79 PRx of the RFIC.

Path 2 of Table 9 is an example of the case where the signal of PA1 and the signal of PA41 flow directly into the LNA79. Therefore, IMD2 according to path 2=−31.5 dBm (PA1) −31.5 dBm (PA41) −10 dBm (LNA79_IP2)=−73 dBm.

Path 3 of Table 9 shows an example of the case where the signal of PA41 flows into PA1, then the signal is output to the antenna through the duplexer, ASM, and switch, and then the output signal flows into the RFIC through the antenna of n7 9 through LNA79. Therefore, IMD2 according to path 3 is 28.5 dBm (PA1)−31.5 dBm (PA41)−28.5 dBm (PA1 IP2)−40 dBm (out-band IL)-1 dB(ASM)-1 dB(SW)-10 dB(Ant_isol)-1 dB (SW) −2 dB(Dup)=−86.5 dBm.

Path 4 in Table 9 is an example of a case in which the signal of PA1 flows into PA41 and is output to the antenna through a duplexer, ASM, and switch, and then the output signal flows into the RFIC through an antenna of n79.

Therefore, IMD2 based on path 4 is −31.5 dBm (PA1)+28.5 dBm (PA41)−28.5 dBm (PA41_IP2)−40 dBm (out-band IL)−1 dB(ASM) −1 dB (SW)−10dB (Ant_isol)−1 dB (SW)−2dB(Dup)=−86.5 dBm.

The total IMD2 summing up IMD2 of Paths 1 to 4 is −72.593 dBm. Adding 4 dB CF, it is −68.593 dBm.

An example of an intermodulation main case of n79 Rx2 will be described with reference to Table 10.

TABLE 10

| path | n1(dBm)_L n1 | n41(dBm)_H n41 | IMD2 |
|---|---|---|---|
| \<path 1\> PA1(PCB isol) + PA41(PCB isol) -\> LNA79 = −31.5(PA1) − 31.5(PA41) − 10(LNA_IP2) | −31.5 | −31.5 | −73 |
| \<path 2\> PA1 + PA41(PCB isol) -\> Dup -\> ASM -\> SW -\> AN to AN -\> SW -\> LNA79 = 28.5(PA1) − 31.5(PA41) − 28.5(PA1_IP2) − 40(out-band IL) − 1(ASM) − 1(SW) − 10(Ant_isol) − 1(SW) − 2(Dup) | 28.5 | −31.5 | −86.5 |
| \<path 3\> PA1(PCB isol) + PA41 -\> Dup -\> ASM -\> SW -\> AN to AN -\> SW -\> Dup -\> LNA79 = −31.5(PA1) + 28.5(PA41) − 28.5(PA41_IP2) − 40(out-band IL) − 1(ASM) − 1(SW) − 10(Ant_isol) − 1(SW) − 2(Dup) | −31.5 | 28.5 | −86.5 |
| total IMD2 | | | −72.6284 |
| total IMD after CF | | | −68.6284 |

Path 1 in Table 10 is an example of a case where the signal of PA1 and the signal of PA41 directly flow into LNA79. Therefore, IMD2 according to path 1 is =−31.5 dBm (PA1)−31.5 dBm (PA41)-10 dBm (LNA79_IP2)=−73 dBm.

Path 2 in Table 10 is an example of a case in which the PA41 signal flows into PA1, the signal is output to the antenna through a duplexer, ASM, and switch, and then the output signal flows into the RFIC through an antenna of n79. Therefore, IMD2 according to path 2 is 28.5 dBm (PA1)-31.5 dBm (PA41)-28.5 dBm (PA1_IP2)-40 dBm (out-band IL)-1 dB(ASM)-1 dB(SW)-10 dB(Ant_isol)-1 dB(SW)-2 dB(Dup)=−86.5 dBm.

Path 3 in Table 10 is an example of a case in which the signal of PA1 flows into PA41 and the signal is output to the antenna through a duplexer, ASM, and switch, and then the output signal flows into the RFIC through an antenna of n79. Therefore, IMD2 according to path 2 is −31.5 dBm (PA1)+28.5 dBm (PA41)-28.5 dBm (PA41_IP2)-40 dBm (out-band IL)-1 dB(ASM)-1 dB (SW)-10 dB (Ant_isol)-1 dB (SW)-2 dB(Dup)=−86.5 dBm.

The total IMD2 summing IMD2 of Paths 1 to 3 is −72.6284 dBm. Adding 4 dB of CF, it is −68.6284 dBm.

When the maximum-ratio combining (MRC) is applied to the interference power of each Rx stage calculated according to the example of Table 9 and the example of Table 10, it may be represented as shown in the example of Table 11.

TABLE 11

| | IMD w CF |
|---|---|
| Rx1 path | −68.593 |
| Rx2 path | −68.6284 |
| After MRC (dBm) | −71.621 |

IMD wCF may mean IMD with Correlation Factor. According to the example in Table 9, the IMD of Rx1 path may be −68.593, and according to the example in Table 10, the IMD of Rx2 path may be −68.6284. When MRC is applied based on the two values, −71.621 dBm is derived.

In band n79, REFSENS based on channel bandwidth 40 MHz is −89.14. For example, in band n79, the REFSENS based on the channel bandwidth having 40 MHz is −89.14.

The MSD value may be determined based on the following equation.

Analyzed MSD (|REFSENS—interference signal power|): |−89.14−(−71.62)|=17.52

The final MSD value of 19.0 dB was derived by adding 1.5 dB of the implementation margin to the 17.52 value. It was rounded to the second decimal place.

The following drawings are intended to illustrate specific embodiments of the present disclosure. The designations of specific devices or the designations of specific signals/messages/fields shown in the drawings are for illustrative purposes only, and the technical features of this specification are not limited to the specific designations used in the drawings below.

Figure 11:
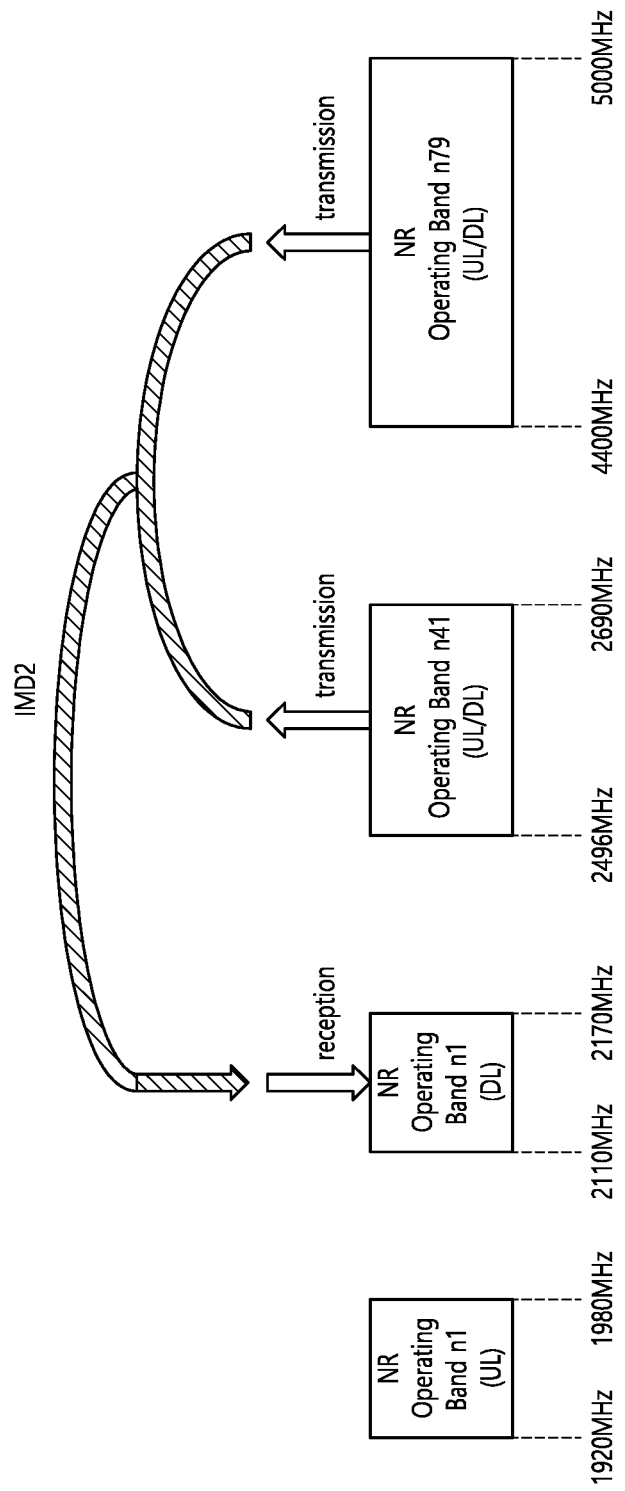
FIG. 11 illustrates a second example of a coexistence issue of CAs based on bands n1, n41, and n79 according to one disclosed embodiment of the present disclosure.

FIG. 11 illustrates a second example of a coexistence issue of CAs based on bands n1, n41, and n79 according to one disclosed embodiment of the present disclosure.

FIG. 11 describes the coexistence issue due to magnetic interference (e.g., IMD2) that occurs for downlink band n1 when CA based on band combinations n1, n41, and n79 is configured for UE.

For example, if an uplink signal is transmitted based on band n41 and band n79 and a downlink signal is received based on band n1, IMD 2 may be an IMD that affects band n1.

Referring to FIG. 11, the secondary IMD (IMD2) component of the uplink signal transmitted in the uplink band n41 and the uplink signal transmitted in the uplink band n79 may enter the frequency range of the downlink band n1.

The worst case in which the influence of IMD 2 is greatest within the frequency range of the downlink band n1 may be as follows. This is when the center frequency of the uplink band n41 is 2530 MHz, the center frequency of the uplink band n79 is 4690 MHz, and the center frequency of the downlink operation band n1 is 21 60 MHz. In this case, since 4690−2530=2160, the frequency of the IMD2 component based on the uplink band n41 and the band n79 matches the center frequency of the downlink band n1.

The following drawings are intended to illustrate specific embodiments of the present disclosure. The designations of specific devices or the designations of specific signals/messages/fields shown in the drawings are for illustrative purposes only, and the technical features of this specification are not limited to the specific designations used in the drawings below.

of paths in which signals transmitted from n41 Tx and signals transmitted from n79 Tx affect will be referred to the following Tables 12 and 13.

Tables 12 and 13 show aggressor power according to paths affecting n1 Rx1 (e.g., n1PRx of FIGS. 12) and n1 Rx2 (e.g., n1DRx of FIG. 12), respectively.

An example of an intermodulation main case of n1 Rx1 will be described with reference to Table 12.

TABLE 12

| path | n41(dBm)_L n41 | n79(dBm)_H n79 | IMD2 |
|---|---|---|---|
| <path 1> PA41(PCB isol) + PA79(PCBisol) -> PA79 -> Dup -> LNA1 = 31.5(PA41) − 31.5(PA79) − 28.5(PA1_IP2) − 2(Dup_IL) | −31.5 | −31.5 | −93.5 |
| <path 2> PA41(PCB isol) + PA79(PCB isol) -> LNA1 = −31.5(PA41) − 31.5(PA79) − 10(LNA1_IP2) | −31.5 | −31.5 | −73 |
| <path 3> PA41 + PA79(PCB isol) -> Dup -> ASM -> SW -> AN to AN -> SW -> Dup -> LNA1 = 28.5(PA41) − 31.5(PA79) − 28.5(PA41_IP2) − 40(out-band IL) − 1(ASM) − 1(SW) − 10(Ant_isol) − 1(SW) − 2(Dup) | 28.5 | −31.5 | −86.5 |
| <path 4> PA1(PCB isol) + PA41 -> Dup -> ASM -> SW -> AN to AN -> SW -> Dup -> LNA1 = −31.5(PA41) + 28.5(PA79) − 28.5(PA79_IP2) − 40(out-band IL) − 1(ASM) − 1(SW) − 10(Ant_isol) − 1(SW) − 2(Dup) | −31.5 | 28.5 | −86.5 |
| total IMD2 | | | −72.593 |
| total IMD after CF(4 dB) | | | −68.593 |

Figure 12:
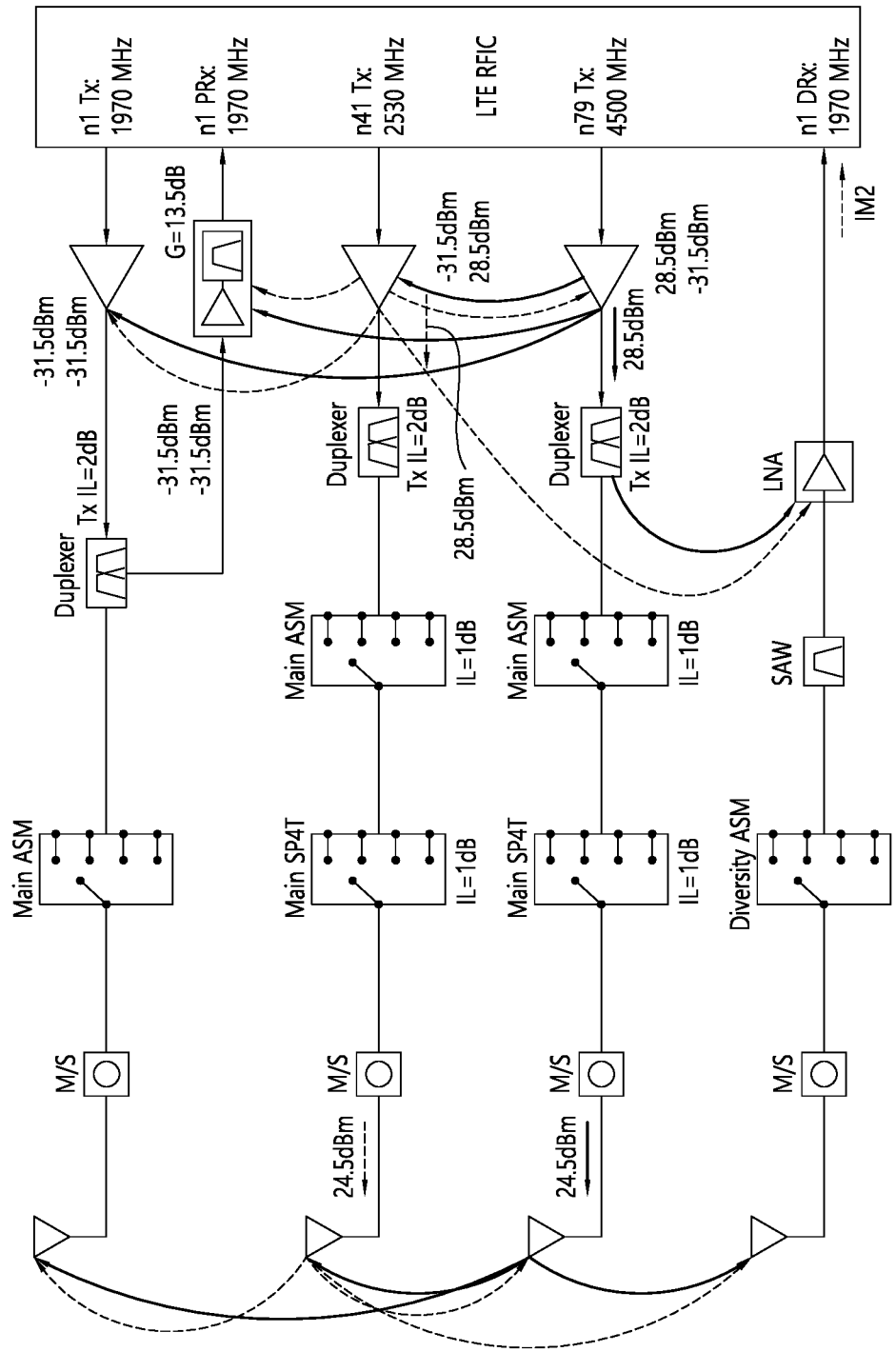
FIG. 12 is a second example illustrating an interference path according to the coexistence issue of CAs based on bands n1, n41, n79 according to one embodiment of the present disclosure.

FIG. 12 is a second example illustrating an interference path according to the coexistence issue of CAs based on bands n1, n41, n79 according to one embodiment of the present disclosure.

In the example of FIG. 12, a signal may be transmitted at a strength of 28.5 dBm at n41 Tx. In the transmission antenna of n41 Tx, a signal may be finally transmitted at a strength of 24.5 dBm. A signal may be transmitted at a strength of 28.5 dBm at n79 Tx. In the transmission antenna of n79 Tx, a signal may be finally transmitted at a strength of 24.5 dBm.

An example of FIG. 12 shows a path through which the IMD2 aggressor of U plink n41-n79 affects downlink n1. For example, FIG. 12 shows interference paths in a situation where Uplink n41-n79 is IMD2 aggressor and Downlink n1 is victim.

In the example of FIG. 12, two Rxs containing diversity Rx were assumed to be included in n1 Rx, and interference was analyzed as assumed. It is assumed that the duplexer insertion loss (e.g., Tx IL in FIG. 12) is 2 dB, and the insertion loss of other switches, connectors, and filters is 1 dB. The out-band IL is assumed to be 40 dB. The correction factor CF in each Rx path was set to 4 dB.

A signal transmitted from n41 Tx and a signal transmitted from n79 Tx may affect a receiving end of n1 based on various paths. For example, as shown on the left side of FIG. 12, signals transmitted from n41 Tx and n79 Tx transmission antennas may flow into antennas related to n1 (e.g., antennas located at the top and bottom of FIG. 12). Various examples Dup means Duplexer. SW stands for switch. PA41 means a signal output from PA of n41 Tx. PA41 (PCB isol) refers to a value in which PCB isolation is applied to a signal output from PA of n41 Tx. PA79 means a signal output from PA of n79 Tx. PA79 (PCB isol) refers to a value in which PCB isolation is applied to a signal output from PA of n79 Tx.

Referring to FIG. 12, Table 12, and Table 13, the strength of the signal output from the PA41 is 28.5 dBm. The strength of the signal output from PA79 is 28.5 dBm.

For reference, in the examples of FIGS. 12, table 12, and table 13, if the signal output from PA41 affects PA79, a signal of −31.5 dBm with PCB isolation applied to 28.5 dBm may affect PA79. −31.5 dBm is also applied when the signal output from PA41 affects PA of n1 Tx. −31.5 dBm is also applied when the signal output from PA41 affects the LNA of n1 PRx (e.g., the component closest to the n1 PRx of the RFIC in the example of FIG. 12). −31.5 dBm is also applied when the signal output from PA41 affects the LNA of n1 DRx.

For reference, in the examples of FIGS. 12, table 12, and table 13, if the signal output from PA79 affects PA41, a signal of −31.5 dBm with PCB isolation applied to 28.5 dMB may affect PA41. −31.5 dBm is also applied when the signal output from PA79 affects PA of n1 Tx. −31.5 dBm is also applied when the signal output from PA79 affects the LNA of n1 PRx (e.g., the component closest to the n1 PRx of the RFIC in the example of FIG. 12). −31.5 dBm is also applied when the signal output from PA79 affects the LNA of n1 DRx.

Path 1 in Table 12 is an example of a case where both the signal of PA41 and the signal of PA79 are introduced into PA1. When the signal of PA41 and the signal of PA79 flow into PA1, PCB isolation is applied, so −31.5 dBm and −31.5 dBm flow into PA1. The signal introduced into PA1 flows into LNA 1 through a duplexer, and then into the RFIC. Therefore, IMD2 according to path 1 is =−31.5 dBm (PA41)-31.5 dBm (PA79)-28.5 dBm (PA1_IP2)-2 dB(Dup_IL) −93.5 dBm.

For reference, the LNA1 of FIG. 12 and Table 12 indicates a component closest to n1PRx of the RFIC.

Path 2 in Table 12 is an example of a case where the signal of PA41 and the signal of PA79 directly flow into LNA1. Therefore, IMD2 according to path 2 is −31.5(PA1)−31.5 (PA41)−10(LNA1 IP2)=−73 dBm.

Path 3 in Table 12 is an example of a case in which the PA79 signal flows into PA41 and is output to the antenna through a duplexer, ASM, and switch, and then the output signal flows into the RFIC through an antenna of n1. Therefore, IMD2 according to path 3 is 28.5 dBm (PA41)− 31.5 dBm (PA79)−28.5 dBm (PA41 IP2)−40 dBm (out-band IL)−1 dB(ASM)−1 dB(SW)−10 dB(Ant_isol)−1 dB (SW) −2 dB(Dup)=−86.5 dBm.

Path 4 in Table 12 is an example of a case in which the signal of PA41 flows into PA79 and is output to the antenna through a duplexer, ASM, and switch, and then the output signal flows into the RFIC through an antenna of n1. Therefore, IMD2 according to path 4 is −31.5 dBm (PA41) +28.5 dBm (PA79) −28.5 dBm (PA79_IP2) −40 dBm (out-band IL) −1 dB(ASM) −1 dB (SW) −10dB (Ant_isol)- 1 dB (SW)−2dB (Dup)=−86.5 dBm.

The total IMD2 summing up IMD2 of Paths 1 to 4 is −72.593 dBm. Adding 4 dB CF, it is −68.593 dBm.

An example of an intermodulation main case of n1 Rx2 will be described with reference to Table 13.

TABLE 13

| path | n41(dBm)_L n41 | n79(dBm)_H n79 | IMD2 |
|---|---|---|---|
| PA41(PCB isol) + PA79(PCB isol) -> LNA1 = −31.5(PA41) − 31.5(PA79) − 10(LNA1_IP2) | −31.5 | −31.5 | −73 |
| PA41 + PA79(PCB isol) -> Dup -> ASM -> SW -> AN to AN -> SW -> LNA79 = 28.5(PA41) − 31.5(PA79) − 28.5(PA41_IP2) − 40( out-band IL) − 1(ASM) − 1(SW) − 10(Ant_isol) − 1(SW) − 2(Dup) | 28.5 | −31.5 | −86.5 |
| PA41(PCB isol) + PA79 -> Dup -> ASM -> SW -> AN to AN -> SW -> Dup -> LNA79 = −31.5(PA41) + 28.5(PA79) − 28.5(PA79_IP2) − 40(out-band IL) − 1(ASM) − 1(SW) − 10(Ant_isol) − 1(SW) − 2(Dup) | −31.5 | 28.5 | −86.5 |
| total IMD2 | | | −72.6284 |
| total IMD after CF | | | −68.6284 |

Path 1 in Table 13 is an example of a case where the signal of PA41 and the signal of PA79 directly flow into LNA1. Therefore, IMD2 according to path 1 is −31.5 dBm (PA41)− 31.5 dBm (PA79)−10 dBm (LNA1 IP2)=−73 dBm.

Path 2 in Table 13 is an example of a case in which the PA79 signal flows into PA41 and is output to the antenna through a duplexer, ASM, and switch, and then the output signal flows into the RFIC through an antenna of n1. Therefore, IMD2 according to path 2 is 28.5 dBm (PA41)− 31.5 dBm (PA79)−28.5 dBm (PA41_IP2)−40 dBm (out-band IL)−1 dB(ASM)−1 dB(SW)−10dB(Ant_isol)−1 dB (SW) −2dB(Dup)=−86.5 dBm.

Path 3 in Table 13 is an example of a case in which the signal of PA41 flows into PA79 and is output to the antenna through a duplexer, ASM, and switch, and then the output signal flows into the RFIC through an antenna of n1. Therefore, IMD2 according to path 3 is −31.5 dBm (PA41) +28.5 dBm (PA79) −28.5 dBm (PA79_IP2) −40 dBm (out-band IL) −1 dB(ASM) −1 dB (SW) −10dB (Ant_isol)- 1 dB (SW)−2dB (Dup)=−86.5 dBm.

The total IMD2 summing IMD2 of Paths 1 to 3 is −72.6284 dBm. Adding 4 dB of CF, it is −68.6284 dBm.

When the maximum-ratio combining (MRC) is applied to the interference power of each Rx stage calculated according to the example of Table 12 and the example of Table 13, it may be represented as shown in the example of Table 14.

TABLE 14

|  | IMD w CF |
|---|---|
| Rx1 path | −68.593 |
| Rx2 path | −68.6284 |
| After MRC (dBm) | −71.621 |

IMD wCF may mean IMD with Correlation Factor. According to the example in Table 12, the IMD of Rx1 path may be −68.593, and according to the example in Table 13, the IMD of Rx2 path may be −68.6284. When MRC is applied based on the two values, −71.621 dBm is derived.

In the band n1, the REFSENS based on the channel bandwidth 5 MHz is −100 dBm.

The MSD value may be determined based on the following equation.

Analyzed MSD (|REFSENS—interference signal power|): |−100−(−71.62)|=28.38

The final MSD value of 29.9 dB was derived by adding 1.5 dB of the implementation margin to the 28.38 value. It was rounded to the second decimal place.

Hereinafter, with reference to FIGS. 13 to 14, coexistence issues for n41, n77, and n79 band combinations (e.g., CA_n41-n77-n79) are analyzed.

The case where UL band n77 and n79 are attackers that cause IMD3 and DL band n41 are victims will be described first.

The following drawings are intended to illustrate specific embodiments of the present disclosure. The designations of specific devices or the designations of specific signals/messages/fields shown in the drawings are for illustrative purposes only, and the technical features of this specification are not limited to the specific designations used in the drawings below.

Figure 13:
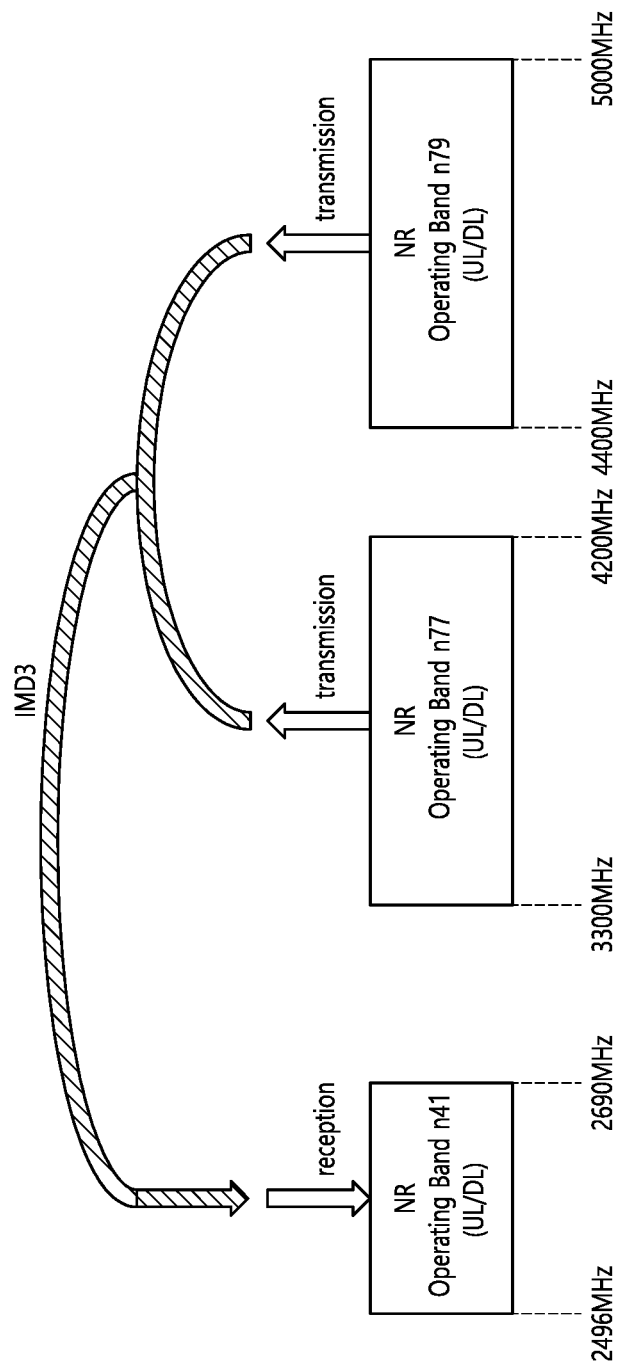
FIG. 13 is an example illustrating the coexistence issue of CAs based on bands n41, n77, n79 according to one embodiment of the present disclosure.

FIG. 13 is an example illustrating the coexistence issue of CAs based on bands n41, n77, n79 according to one embodiment of the present disclosure.

FIG. 13 describes a coexistence issue due to magnetic interference (e.g., IMD 3) that occurs for the downlink band n41 when a CA based on the band combination n41, n77, and n79 is set for the UE.

For example, if an uplink signal is transmitted based on band n77 and band n79 and a downlink signal is received based on band n41, IMD 3 may be an IMD that affects band n41.

Referring to FIG. 13, the third IMD (IMD3) component of the uplink signal transmitted in the uplink band n77 and the uplink signal transmitted in the uplink band n79 may enter the frequency range of the downlink band n41.

The worst case in which the influence of IMD 3 is greatest within the frequency range of the downlink band n41 may be as follows. This is when the center frequency of the uplink band n77 is 3600 MHz, the center frequency of the uplink band n79 is 4600 MHz, and the center frequency of the downlink operation band n41 is 2 600 MHz. In this case, since 3600*2−4600=2600, the frequency of the IMD3 component based on the uplink band n77 and the band n79 matches the center frequency of the downlink band n41.

The following drawings are intended to illustrate specific embodiments of the present disclosure. The designations of specific devices or the designations of specific signals/messages/fields shown in the drawings are for illustrative purposes only, and the technical features of this specification are not limited to the specific designations used in the drawings below.

Figure 14:
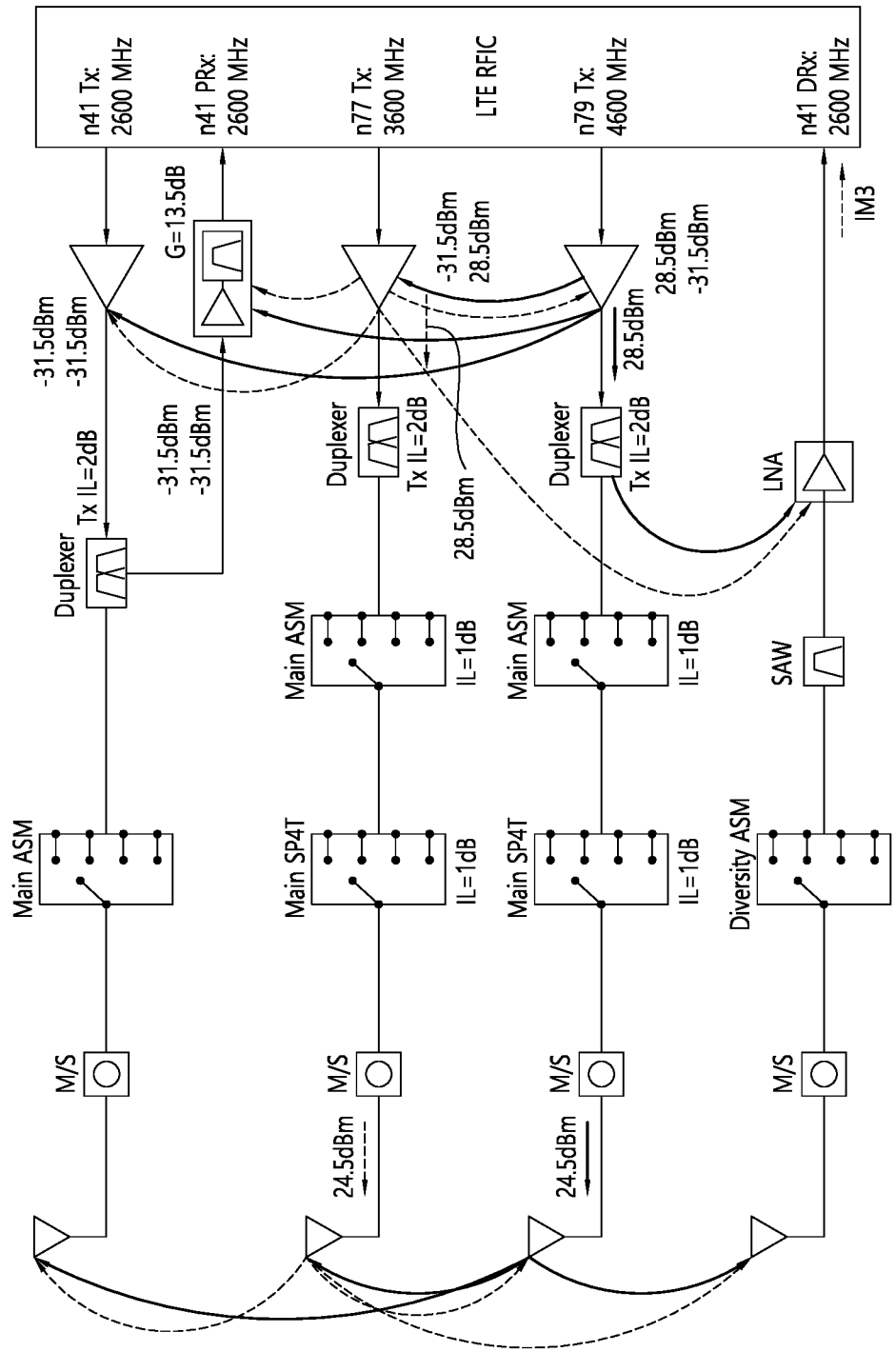
FIG. 14 illustrates an example of an interference path according to the coexistence issue of CAs based on bands n41, n77, and n79 according to one embodiment of the present disclosure.

FIG. 14 illustrates an example of an interference path according to the co existence issue of CAs based on bands n41, n77, and n79 according to one embodiment of the present disclosure.

In the example of FIG. 14, a signal may be transmitted at a strength of 28.5 dBm at n77 Tx. In the transmission antenna of n41 Tx, a signal may be finally transmitted at a strength of 24.5 dBm. A signal may be transmitted at a strength of 28.5 dBm at n79 Tx. In the transmission antenna of n79 Tx, a signal may be finally transmitted at a strength of 24.5 dBm.

An example of FIG. 14 shows a path through which the IMD3 aggregate of Uplink n77-n79 affects downlink n41. For example, FIG. 14 shows interference paths in a situation where Uplink n77-n79 is an IMD2 aggressor and Downlink n41 is victim.

In the example of FIG. 14, two Rxs containing diversity Rx were assumed to be included in n1 Rx, and interference was analyzed as assumed. It is assumed that the duplexer insertion loss (e.g., Tx IL in FIG. 14) is 2 dB, and the insertion loss of other switches, connectors, and filters is 1 dB. The out-band IL is assumed to be 40 dB. The correction factor CF in each Rx path was set to 4 dB.

A signal transmitted from n77 Tx and a signal transmitted from n79 Tx may affect a receiving end of n41 based on various paths. For example, as shown on the left side of FIG. 14, signals transmitted from n77 Tx and signals transmitted from n79 Tx may flow into antennas related to n41 (e.g., antennas located at the top and bottom of FIG. 14). Table 15 and Table 16 below will be referred to for various examples of paths in which signals transmitted from n77 Tx and signals transmitted from n79 Tx affect.

Tables 15 and 16 show aggregator power according to paths affecting n41 Rx1 (e.g., n41 PRx of FIGS. 14) and n41 Rx2 (e.g., n41 DRx of FIG. 14), respectively.

An example of an intermodulation main case of n41 Rx1 will be described with reference to Table 15.

TABLE 15

| path | n77(dBm)_L n77 | n79(dBm)_H n79 | IMD2 |
|---|---|---|---|
| <path 1> PA77(PCB isol) + PA79(PCBisol) -> PA41 -> Dup -> LNA41 = −2*31.5(PA77) − 31.5(PA79) − 2*30(PA_IP3) − 2(Dup_IL) | −31.5 | −31.5 | −156.5 |
| <path 2> PA77(PCB isol) + PA79(PCB isol) -> LNA41 = −2*31.5(PA77) − 31.5(PA79) − 2*0(LNA79_IP3) | −31.5 | −31.5 | −94.5 |
| <path 3> PA77 + PA79(PCB isol) -> Dup -> ASM -> SW -> AN to AN -> SW -> Dup -> LNA41 = 2*28.5(PA77) − 31.5(PA79) − 2*30(PA41_IP3) − 40(out-band IL) − 1(ASM) − 1(SW) − 10(Ant_isol) − 1(SW) − 2(Dup) | 28.5 | −31.5 | −89.5 |
| <path 4> PA77(PCB isol) + PA79 -> Dup -> ASM -> SW -> AN to AN -> SW -> Dup -> LNA41 = −2*31.5(PA77) + 28.5(PA79) − 2*30(PA41_IP3) − 40(out-band IL) − 1(ASM) − 1(SW) − 10(Ant_isol) − 1(SW) − 2(Dup) | −31.5 | 28.5 | −149.5 |
| total IMD3 | | | −88.3067 |
| total IMD after CF(4 dB) | | | −84.3067 |

Dup means Duplexer. SW stands for switch. PA77 means a signal output from PA of n77 Tx. PA77 (PCB isol) refers to a value in which PCB isolation is applied to a signal output from PA of n77 Tx. PA79 means a signal output from PA of n79 Tx. PA79 (PCB isol) refers to a value in which PCB isolation is applied to a signal output from PA of n79 Tx.

Referring to FIG. 14, Table 15, and Table 16, the strength of the signal output from the PA77 is 28.5 dBm. The strength of the signal output from PA79 is 28.5 dBm.

For reference, in the examples of FIG. 14, Table 15, and Table 16, if the signal output from PA77 affects PA79, a signal of −31.5 dBm with PCB isolation applied to 28.5dMB may affect PA79. −31.5 dBm is also applied when the signal output from the PA77 affects the PA of n41 Tx. −31.5 dBm is also applied when the signal output from PA77 affects the LNA of n41PRx (e.g., the component closest to the n4 1PRx of the RFIC in the example of FIG. 14). −31.5 dBm is also applied when the signal output from PA77 affects the LNA of n41 DRx.

For reference, in the examples of FIG. 14, Table 15, and Table 16, if the signal output from PA79 affects PA77, a signal of −31.5 dBm with PCB isolation applied to 28.5 dMB may affect PA77. −31.5 dBm is also applied when the signal output from PA79 affects PA of n41 Tx. −31.5 dBm is also applied when the signal output from PA79 affects the LNA of n41PRx (e.g., the component closest to the n41PRx of the RFIC in the example of FIG. 12). −31.5 dBm is also applied when the signal out put from PA79 affects the LNA of n41 DRx.

Path 1 in Table 15 is an example of a case where both the signal of PA77 and the signal of PA79 flow into PA41. When the signal of PA77 and the signal of PA79 flow into PA41, PCB isolation is applied, so −31.5 dBm and −31.5 dBm flow into PA1. The signal introduced into PA1 flows into LNA 1 through a duplexer, and then into the RFIC. Therefore, IMD3 according to path 1 is −2*31.5 dBm (PA77)−31.5 dBm (PA79)−2*30 dBm (PA_IP3)−2 dB(Dup_IL)=−156.5 dBm. For example, IMD3 may be determined based on 2*Flow+Phi−2* output interception point 3 (01P3).

For reference, the LNA41 of FIG. 14 and Table 15 indicates the component closest to the n41PRx of the RFIC.

Path 2 of Table 15 is an example of a case where the signal of PA41 and the signal of PA79 directly flow into LNA1. Therefore, IMD3 according to path 2 is −2*31.5(PA77)−31.5(PA79)−10(LNA411P3)=−94.5 dBm.

Path 3 in Table 15 is an example of a case in which the PA79 signal enters the PA77 and is output to the antenna through a duplexer, ASM, and switch, and then the output signal flows into the RFIC through an antenna of n41. Therefore, IMD3 according to path 3 is 2*28.5 dBm (PA77)−31.5 dBm (PA79)−2*30 dBm (PA41_IP3)−40d Bm (out-band IL)−1 dB(ASM)−1 dB(SW)−10dB(Ant_isol)−1 dB(SW)−2dB(Dup)=−89.5 dBm.

Path 4 in Table 15 is an example of a case in which the signal of PA77 flows into PA79 and is output to the antenna through a duplexer, ASM, and switch, and then the output signal flows into the RFIC through an antenna of n41. Therefore, IMD3 according to path 4 is −2*31.5 dBm (PA77)+28.5 dBm (PA79)−2*30 dBm (PA41 IP3)−40 dBm (out-band IL)−1 dB(ASM) −1 dB (SW)−10dB (Ant_isol)−1 dB (SW)−2dB(Dup)=−149.5 dBm.

The total IMD2 summing IMD3 of Paths 1 to 4 is −88.3067 dBm. Adding 4 dB CF, it is −84.3067 dBm.

An example of an intermodulation main case of n41 Rx2 will be described with reference to Table 16.

TABLE 16

| path | n77(dBm)_L n77 | n79(dBm)_H n79 | IMD2 |
|---|---|---|---|
| <path 1><br>PA77(PCB isol) + PA79(PCB isol) -><br>LNA41 = −2*31.5(PA77) − 31.5(PA79) −<br>2*0(LNA_IP3) | −31.5 | −31.5 | −94.5 |
| <path 2><br>PA77 + PA79(PCB isol) -> Dup -> ASM -><br>SW -> AN to AN -> SW -> LNA41 =<br>2*28.5(PA77) − 31.5(PA79) − 2*30(PA41_IP3) −<br>40(out-band IL) − 1(ASM) − 1(SW) − 10(Ant_isol) −<br>1(SW) − 2(Dup) | 28.5 | −31.5 | −86.5 |
| <path 3><br>PA77(PCB isol ) + PA79 -> Dup -> ASM -> SW -> AN<br>to AN -> SW -> Dup -> LNA41 = −2*31.5(PA77) +<br>28.5(PA79) − 2*30(PA41_IP3) −<br>40(out-band IL) − 1(ASM) − 1(SW) −<br>10(Ant_isol) − 1(SW) − 2(Dup) | −31.5 | 28.5 | −146.5 |
| total IMD3 | | | −85.8611 |
| total IMD after CF | | | −81.8611 |

Path 1 in Table 16 is an example of a case where the signal of PA77 and the signal of PA79 directly flow into the LNA41. Therefore, IMD3 according to path 1 is −2*31.5 dBm (PA77)−31.5 dBm (PA79)−2*0 dBm (LNA IP3)=−94.5 dBm.

Path 2 in Table 16 is an example of a case in which the PA79 signal flows into the PA77 and is output to the antenna through the duplexer, ASM, and switch, and then the output signal flows into the RFIC through the LNA41 antenna through the n41 antenna. Therefore, IMD3 according to path 2 is 2*28.5 dBm (PA77)−31.5 dBm (PA79)−2*30 dBm (PA41 IP3)−40 dBm (out-band IL)−1 dB (ASM)−1 dB (SW)−10dB (Ant_isol)−1 dB (SW)−2dB (Dup)=−86.5 dBm.

Path 3 in Table 16 is an example of a case in which the signal of PA77 flows into PA79 and is output to the antenna through a duplexer, ASM, and switch, and then the output signal flows into the RFIC through an antenna of n41. Therefore, IMD2 according to path 3 is −2*31.5 dBm (PA77) +28.5 dBm (PA79)−2*30 dBm (PA41_IP2)−40 dBm (out-band IL)−1 dB(ASM) −1 dB (SW)−10dB (Ant_isol)−1 dB (SW)−2 dB(Dup)=−146.5 dBm.

Total IMD3, which is the sum of IMD3 of Paths 1 to 3, is −85.8611d Bm. Adding CF 4 dB, we get −81.8611 dBm.

When MRC is applied to the interference power of each Rx stage calculated according to the examples of Table 15 and Table 16, it can be represented as shown in the example of Table 17.

TABLE 17

|  | IMD w CF |
| --- | --- |
| Rx1 path | −84.3067 |
| Rx2 path | −81.8611 |
| After MRC (dBm) | −86.2641 |

IMD wCF may mean IMD with Correlation Factor. According to the example in Table 15, the IMD of the Rx1 path may be −84.3067, and according to the example in Table 16, the IMD of the Rx2 path may be −81.8611. When MRC is applied based on the two values, −86.2641 dBm is derived.

In the band n41, the REFSENS based on the channel bandwidth 5 MHz is −95.5 dBm.

The MSD value may be determined based on the following equation.

Analyzed MSD (|REFSENS—interference signal power|): |−95.5−(−86.26)|=9.24

The final MSD value of 10.7 dB was derived by adding 1.5 dB of the implementation margin to the 9.24 value. For your information, it was rounded to the second decimal place.

The MSD values based on the intermodulation distortion of CAn1-n41-n79 and CAn41-n77-n79 are as shown in the examples of Table 18, as analyzed based on F IGS. 9 to 14, Tables 7 to 17.

Table 18 shows examples of results derived based on MSD test setup and IMD problems. Table 18 shows MSD values applicable to various CA band combinations.

The MSD value of Table 18 may be used when testing the UE based on a requirement for reception performance of the UE. For example, the transceiver (transceiver) and/or receiver of the UE can be tested to determine whether the MSD value according to the example in Table 18 meets the applied reference sensitivity (REFSENS). The transceiver of the UE may receive a downlink signal. The UE's transceiver may be a transceiver that has been tested to determine whether the UE's downlink signal throughput is more than 95% of the reference measurement channel's maximum throughput based on REFSENS to which the MSD value is applied.

For example, a CA based on bands n1, n41, and n79 may be set for the UE.

For example, such a CA may be set for one or more transceivers included in the UE. In this case, since the signal transmitted from the uplink bands n1 and n41 may affect the downlink band n79, the REFSENS may be relaxed by the MSD value of 19.0 dB. For example, one or more transceivers can transmit uplink signals through a channel with a central frequency of 1970 MHz and a bandwidth of 5 MHz in the uplink band n1, and an uplink signal through a channel with a central frequency of 2530 MHz and a bandwidth of 10 MHz. In this situation, when one or more transceivers receive a downlink signal through a channel with a center frequency of 4500 M Hz and a bandwidth of 40 MHz, REFSENS can be relaxed by an MSD value of 19.0 dB. Based on relaxed values. One or more transceivers can be tested to determine whether the UE's downlink signal throughput is more than 95% of the reference measurement channel's maximum throughput. The UE may include one or more transceivers that have passed the test.

TABLE 18

| | | Band/Channel bandwidth/$N_{RB}$/Duplex mode | | | | | | |
| --- | --- | --- | --- | --- | --- | --- | --- | --- |
| NR CA band combination | NR band | UL $F_c$ (MHz) | UL/DL BW (MHz) | UL $L_{CRB}$ | DL $F_c$ (MHz) | MSD (dB) | Duplex mode | Source of IMD |
| CA_n1-n41-n79 | n1 | 1970 | 5 | 25 | 2160 | N/A | FDD | N/A |
| | n41 | 2530 | 10 | 50 | 2530 | N/A | TDD | N/A |
| | n79 | 4500 | 40 | 216 | 4500 | 19.0 | TDD | IMD2 |
| | n41 | 2530 | 10 | 50 | 2530 | N/A | TDD | N/A |
| | n79 | 4690 | 40 | 216 | 4690 | N/A | TDD | N/A |
| | n1 | 1970 | 5 | 25 | 2160 | 29.9 | FDD | IMD2 |
| CA_n41-n77-n79 | n77 | 3600 | 10 | 50 | 3600 | N/A | TDD | N/A |
| | n79 | 4600 | 40 | 216 | 4600 | N/A | TDD | N/A |
| | n41 | 2600 | 10 | 50 | 2600 | 10.7 | TDD | IMD3 |

In the example of Table 18, Fc means a center frequency. BW stands for bandwidth. For example, ULFc may refer to the central frequency of the uplink operation band or the central frequency of the Component Carrier (CC) set in the uplink operation band. Here, the $L_{CRB}$ may mean a length of continuous resource block.

The example of Table 18 may be an example of an MSD test configuration proposed according to an embodiment of the present specification. The self-desense problem was analyzed according to various examples of an embodiment of the present disclosure of this specification, and examples of MSD values derived according to the results are MSD values in Table 18. For reference, tolerance ±α may be applied to M SD values as shown in Table 18. α may be 0, 0.1, 0.2, 0.3, 0.4, 0.5, 0.6, 0.7, . . . 2.7.

As another example, such a CA may be configured for one or more transceivers included in the UE. In this case, since the signals transmitted from the uplink bands n41 and n79 may affect the downlink band n1, the REFSENS may be relaxed by the MSD value of 29.9 dB. For example, one or more transceivers can transmit up link signals through a channel with a central frequency of 2530 MHz and a bandwidth of 10 MHz in the uplink band n41 and an uplink signal through a channel with a central frequency of 4690 MHz and a bandwidth of 40 MHz. In this situation, when one or more transceivers receive a downlink signal through a channel with a central frequency of downlink band n1 of 1970 MHz and a bandwidth of 5 MHz, REFSENS can be relaxed by an MSD value of 29.9 dB. Based on relaxed values. One or more transceivers can be tested to determine whether the UE's downlink signal throughput is more than 95% of the reference measurement channel's maximum throughput. The UE may include one or more transceivers that have passed the test.

For example, a CA based on bands n41, n77, and n79 may be set for the UE.

For example, such a CA may be set for one or more transceivers included in the UE. In this case, since the signals transmitted from the uplink bands n77 and n79 may affect the downlink band n41, the REFSENS may be relaxed by the MSD value of 10.7 dB. For example, one or more transceivers can transmit uplink signals through a channel with a central frequency of 3600 MHz and a bandwidth of 10 MHz in the uplink band n77 and an uplink signal through a channel with a central frequency of 4600 MHz and a bandwidth of 40 MHz. In this situation, when one or more transceivers receive a downlink signal through a channel with a central frequency of 2 600 MHz and a bandwidth of 10 MHz in the downlink band n41, REFSENS can be relaxed by an MSD value of 10.7 dB. Based on relaxed values. One or more transceivers can be tested to determine whether the UE's downlink signal throughput is more than 95% of the reference measurement channel's maximum throughput. The UE may include one or more transceivers that have passed the test.

The following drawings are intended to illustrate specific embodiments of the present disclosure. The designations of specific devices or the designations of specific signals/messages/fields shown in the drawings are for illustrative purposes only, and the technical features of this specification are not limited to the specific designations used in the drawings below.

Figure 15:
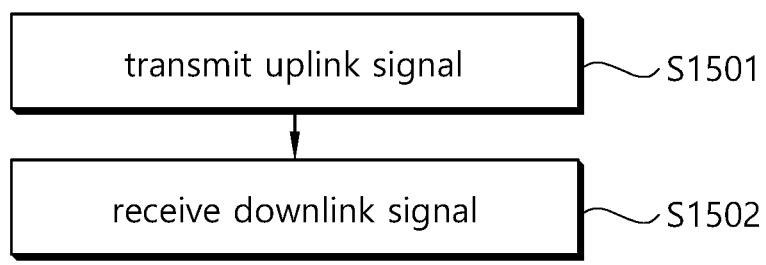
FIG. 15 illustrates an example of a procedure according to one embodiment of the present disclosure.

FIG. 15 illustrates an example of a procedure according to one embodiment of the present disclosure.

For example, the operation described in the examples of FIGS. 1 to 14 may also be applied to the example of FIG. 15. For example, even if it is an operation, content, or the like not directly described in the example of FIG. 15, the operation, content, or the like described in various examples of the present disclosure of this specification may be applied.

The UE may include one or more transceivers; one or more processors; and one or more memories that can store instructions and be operatively connected to the above one or more processors. Based on the execution of the instruction by the one or more processors, operations described below may be performed.

In step S1501, the UE may transmit an uplink signal. For example, the UE may transmit an uplink signal through one or more transceivers. One or more transceivers may be configured to perform uplink transmission based on two NR operation bands among operation bands n1, n41, n77, and n79.

In step S1502, the UE may receive a downlink signal. For example, the UE may receive a downlink signal through one or more transceivers. The downlink signal may be received based on one of the NR operation bands n1, n41, n77, and n79.

A CA may be configured for the one or more transceivers based on the two NR operation bands and the one NR operation bands. For example, i) the above two NR operating bands may be bands n1, n41, the above one NR operating band may be band n79, ii) the above two NR operating bands may be band n41 and n79, or iii) the above two NR operating bands may be band n77 and n79, and the above one NR operating band may be n41. Based on this combination of bands for CA, the reference sensitivity set for one or more transceivers above for downlink reception through the above one NR operating band can be relaxed by MSD.

For example, the MSD may be 19.0 dB based on the fact that the two NR operating bands are bands n1 and n41, and the one NR operating band is band n79. In this case, the requirements for reference sensitivity can be tested for one or more transceivers above, based on the fact that the uplink center frequency for band n1 is 1970 MHz, the uplink center frequency for band n41 is 2530 MHz, and the downlink center frequency for band n79 is 4500 MHz.

For example, based on the two NR operating bands being bands n41 and n79, and the one NR operating band being band n1, the MSD may be 29.9 dB. In this case, the requirements for the above one or more transceivers for reference sensitivity can be tested based on the fact that the uplink center frequency for the above band n41 is 2530 MHz, the uplink center frequency for the above band n79 is 4690 MHz, and the downlink center frequency for the above band n1 is 1970 MHz.

For example, based on the two NR operating bands being bands n77 and n79 and the one NR operating band being band n41, the MSD may be 10.7 dB. In this case, the requirements for reference sensitivity can be tested for one or more transceivers above, based on the fact that the uplink center frequency for the above band n77 is 3600 MHz, the uplink center frequency for the above band n79 is 4600 MHz, and the downlink center frequency for the above band n41.

The present specification may have various effects.

For example, according to various examples of the present disclosure herein, the coexistence issue can be solved by analyzing the coexistence issue of the band combination used for CA and analyzing the MSD. For example, when CA based on bands n1, n41, and n79 or CA based on bands n41, n77, and n79 is configured for the UE, the MSD analyzed according to various examples of the present disclosure herein may be applied. Accordingly, the coexistence issue can be solved.

The effects that may be obtained from the specific examples of this disclosure are not limited to those listed above. For example, there may be a variety of technical effects that a person having ordinary skill in the related art may understand or infer from this disclosure. Accordingly, the specific effects of the present disclosure are not limited to those expressly set forth herein, but may include a variety of effects that may be understood or inferred from the technical features of the present disclosure.

For reference, the operation of the terminal (e.g., UE) described in the present disclosure of the present specification may be implemented by the devices of FIGS. 1 to 3 described above. For example, the terminal (e.g., UE) may be the first device 100 or the second device 200 of FIG. 1. For example, the operation of a terminal (e.g., UE) described in the present disclosure of the present specification may be processed by one or more processors 102 or 202. The operation of the terminal described in the present disclosure of the present specification may be stored in one or more memories 104 or 204 in the form of an instruction/program (e.g., instruction and executable code) executable by the one or more processors 102 or 202. The one or more processors 102 or 202 may control the one or more memories 104 or 204 and one or more transceivers 105 or 206 and execute instructions/programs stored in the one or more memories 104 or 204 to perform the operation of a terminal (e.g., UE) described in the present disclosure of the present specification.

In addition, instructions for performing the operation of the terminal (e.g., UE) described in the present disclosure of the present specification may be stored in a non-volatile computer-readable storage medium. The storage medium may be included in the one or more memories 104 or 204. In addition, the instructions recorded in the storage medium may be executed by the one or more processors 102 or 202 to perform the operation of a terminal (e.g., UE) described in the present disclosure of the present specification.

For reference, the operations of network node (e.g. AMF, SMF, UPF, PCF, AUSF, etc.) or base station (e.g. NG-RAN, gNB, eNB, etc.) described in the present disclosure of the present specification may be implemented by the devices of FIGS. 1 to 3 which will be described below. For example, the network node or the base station may be the first device 100a or the second device 100b of FIG. 1. For example, the operation of the network node or the base station described in the present disclosure of the present specification may be processed by one or more processors 102 or 202. The operation of the network node or the base station described in the present disclosure of the present specification may be stored in one or more memories 104 or 204 in the form of an instruction/program (e.g., instruction and executable code) executable by the one or more processors 102 or 202. The one or more processors 102 or 202 may control the one or more memories 104 or 204 and one or more transceivers 106 or 206 and execute instructions/programs stored in the one or more memories 104 or 204 to perform the operation of the network node or the base station described in the present disclosure of the present specification.

In addition, the instructions for performing the operation of the NTN network described in the present disclosure of the present specification may be stored in a non-volatile (or non-transitory) computer-readable storage medium. The storage medium may be included in the one or more memories 104 or 204. In addition, the instructions recorded in the storage medium may be executed by the one or more processors 102 or 202 to perform the operation of the NTN network described in the present disclosure of the present specification.

Although preferred embodiments have been described above, the present disclosure of the present specification is not limited to such specific embodiments and thus can be modified, changed, or improved in various manners within the spirt of the present disclosure of the present specification and the scope of the claims.

Although methods are described as a series of steps or blocks based on a flowchart in the exemplary system described above, they are not limited to the order of the described steps, and some steps may occur in a different order or simultaneously with other steps as described above. In addition, those skilled in the art will understand that the steps shown in the flowchart are not exclusive, and that other steps may be included or that one or more steps of a flowchart may be deleted without affecting the scope of rights.

The claims described herein may be combined in various ways. For example, the technical features of the method claims of the present disclosure of the present specification may be combined and implemented as an apparatus, and the technical features of the apparatus claims of the present disclosure of the present specification may be combined and implemented as a method. In addition, the technical features of the method claims of the present disclosure of the present specification and the technical features of the apparatus claims may be combined and implemented as an apparatus, and the technical features of the method claims of the present disclosure and the technical features of the apparatus claims may be combined and implemented as a method. Other implementations are within the scope of the following claims.

What is claimed is:

1. A user equipment (UE) configured to operate in a wireless communication system, the UE comprising:
   at least one transceiver;
   at least one processor; and
   at least one memory that stores instructions and is operably electrically connectable with the at least one processor,
   wherein operations performed based on the instructions being executed by the at least one processor include:
   transmitting an uplink signal based on the one or more transceivers; and
   receiving a downlink signal based on the one or more transceivers;
   wherein the one or more transceivers are configured to perform uplink transmission based on two NR operating bands among New Radio (NR) operating bands n1, n41, n77, and n79,
   wherein the downlink signal is received based on one of the NR operating bands n1, n41, n77, and n79,
   based on the two NR operating bands and the one NR operating band, carrier aggregation (CA) is configured for the one or more transceivers,
   based on that i) the two NR operating bands are bands n1 and n41 and the one NR operating band is band n79, or ii) the two NR operating bands are bands n41 and n79 and the one NR operating band is band n1 or iii) the two NR operating bands are bands n77 and n79, and based on the one NR operating band being band n41, a reference sensitivity configured for the one or more transceivers for downlink reception based on the one NR operating band is relaxed by Maximum Sensitivity Degradation (MSD).

2. The UE of claim 1,
   based on that the two NR operating bands are bands n1 and n41, and the one NR operating band is a band n79, the MSD is 19.0 dB.

3. The UE of claim 2,
   wherein the uplink center frequency for the band n1 is 1970 MHz,
   wherein the uplink center frequency for the band n41 is 2530 MHz,
   based on the downlink center frequency for the above band n79 being 4500 MHz, requirements for the above reference sensitivity are tested for the one or more transceivers.

4. The UE of claim 1,
   based on that the two NR operating bands are bands n41 and n79, and the one NR operating band is a band n1, the MSD is 29.9 dB.

5. The UE of claim 4,
   wherein the uplink center frequency for the band n41 is 2530 MHz,
   wherein the uplink center frequency for the band n79 is 4690 MHz,
   based on the downlink center frequency for the above band n1 being 1970 MHz, requirements for the above reference sensitivity are tested for the one or more transceivers.

6. The UE of claim 1,
   based on that the two NR operating bands are bands n77 and n79 and the one NR operating band is a band n41, the MSD is 10.7 dB.

7. The UE of claim 6,
wherein the uplink center frequency for the band n77 is 3600 MHz,
wherein the uplink center frequency for the band n79 is 4600 MHz,
based on the downlink center frequency for the above band n41 being 2600 MHz, requirements for the above reference sensitivity are tested for the one or more transceivers.

8. A method for performing communication, the method performed by a User Equipment (UE) and comprising:
transmitting an uplink signal through one or more transceivers included in the UE; and
receiving a downlink signal through the one or more transceivers;
wherein the one or more transceivers are configured to perform uplink transmission based on two NR operating bands among New Radio (NR) operating bands n1, n41, n77, and n79,
wherein the downlink signal is received based on one of the NR operating bands n1, n41, n77, and n79,
based on the two NR operating bands and the one NR operating band, carrier aggregation (CA) is configured for the one or more transceivers,
based on that i) the two NR operating bands are bands n1 and n41 and the one NR operating band is band n79, or ii) the two NR operating bands are bands n41 and n79 and the one NR operating band is band n1 or iii) the two NR operating bands are bands n77 and n79, and based on the one NR operating band being band n41, a reference sensitivity configured for the one or more transceivers for downlink reception based on the one NR operating band is relaxed by Maximum Sensitivity Degradation (MSD).

9. The method of claim 8,
based on that the two NR operating bands are bands n1 and n41, and the one NR operating band is a band n79, the MSD is 19.0 dB.

10. The method of claim 8,
wherein the uplink center frequency for the band n1 is 1970 MHz,
wherein the uplink center frequency for the band n41 is 2530 MHz,
based on the downlink center frequency for the above band n79 being 4500 MHz, requirements for the above reference sensitivity are tested for the one or more transceivers.

11. The method of claim 8,
based on that the two NR operating bands are bands n41 and n79, and the one NR operating band is a band n1, the MSD is 29.9 dB.

12. The method of claim 11,
wherein the uplink center frequency for the band n41 is 2530 MHz,
wherein the uplink center frequency for the band n79 is 4690 MHz,
based on the downlink center frequency for the above band n1 being 1970 MHz, requirements for the above reference sensitivity are tested for the one or more transceivers.

13. The method of claim 8,
based on that the two NR operating bands are bands n77 and n79, and the one NR operating band is a band n41, the MSD is 10.7 dB.

14. The method of claim 13,
wherein the uplink center frequency for the band n77 is 3600 MHz,
wherein the uplink center frequency for the band n79 is 4600 MHz,
based on the downlink center frequency for the above band n41 being 2600 MHz, requirements for the above reference sensitivity are tested for the one or more transceivers.

15. A user equipment (UE) configured to operate in a wireless communication system, the UE comprising:
at least one transceiver;
at least one processor; and
at least one memory that stores instructions and is operably electrically connectable with the at least one processor,
wherein operations performed based on the instructions being executed by the at least one processor include:
transmitting an uplink signal based on the one or more transceivers; and
receiving a downlink signal based on the one or more transceivers;
wherein the one or more transceivers are configured to perform uplink transmission based on two NR operating bands among New Radio (NR) operating bands n1, n41, n77, and n79,
wherein the downlink signal is received based on one of the NR operating bands n1, n41, n77, and n79,
based on the two NR operating bands and the one NR operating band, carrier aggregation (CA) is configured for the one or more transceivers,
based on that i) the two NR operating bands are bands n1 and n41 and the one NR operating band is band n79, or ii) the two NR operating bands are bands n41 and n79 and the one NR operating band is band n1, a reference sensitivity configured for the one or more transceivers for downlink reception based on the one NR operating band is relaxed by Maximum Sensitivity Degradation (MSD), and
wherein the MSD is 19.0 dB or 29.9 dB.

* * * * *